United States Patent
Horning et al.

(10) Patent No.: US 10,896,316 B2
(45) Date of Patent: Jan. 19, 2021

(54) AUTOMATED MICROSCOPY SCANNING SYSTEMS AND METHODS

(71) Applicant: Tokitae LLC, Bellevue, WA (US)

(72) Inventors: Matthew Horning, Redmond, WA (US); Liming Hu, Kent, WA (US); Shawn McGuire, Seattle, WA (US); Courosh Mehanian, Redmond, WA (US)

(73) Assignee: Tokitae, LLC, Bellevue, WA (US)

( * ) Notice: Subject to any disclaimer, the term of this patent is extended or adjusted under 35 U.S.C. 154(b) by 173 days.

(21) Appl. No.: 16/266,945

(22) Filed: Feb. 4, 2019

(65) Prior Publication Data

US 2020/0250396 A1 Aug. 6, 2020

(51) Int. Cl.
  *G06K 9/00* (2006.01)
  *G06T 7/00* (2017.01)
  *G02B 21/00* (2006.01)
  *G02B 21/26* (2006.01)

(52) U.S. Cl.
  CPC ....... *G06K 9/00134* (2013.01); *G02B 21/008* (2013.01); *G06K 9/0014* (2013.01); *G06T 7/0012* (2013.01); *G02B 21/26* (2013.01); *G06T 2207/10056* (2013.01); *G06T 2207/20021* (2013.01); *G06T 2207/30024* (2013.01); *G06T 2207/30168* (2013.01)

(58) Field of Classification Search
  None
  See application file for complete search history.

(56) References Cited

U.S. PATENT DOCUMENTS

| | | | |
|---|---|---|---|
| 6,049,421 A | 4/2000 | Raz et al. | |
| 6,656,428 B1 | 12/2003 | Clark et al. | |
| 7,151,246 B2 | 12/2006 | Fein et al. | |
| 7,558,415 B2 | 7/2009 | McLaren et al. | |

(Continued)

OTHER PUBLICATIONS

Liu, L., Ouyang, W., Wang, X., Fieguth, P.W., Chen, J., Liu, X., & Pietikäinen, M. (2018). Deep Learning for Generic Object Detection: A Survey. CoRR; located at https://arxiv.org/pdf/1809.02165.pdf.

(Continued)

*Primary Examiner* — Fan Zhang
(74) *Attorney, Agent, or Firm* — AEON Law

(57) ABSTRACT

Techniques and technologies for automated microscopy scanning systems are disclosed wherein a microscopy system performs "hunt mode" operations at coarsely-spaced locations throughout a scanning window until an acceptable quality scan result is achieved. The system then performs detailed scans at all fields of view within a grid cell that includes the location having the acceptable scan result. The system performs another evaluation of the scan results for the entire grid cell, and if the scan results for the grid cell are collectively acceptable, then the system proceeds to perform "scan mode" operations. The scan mode operations include scanning and evaluating all of the fields of view within one or more grid cells adjacent to the acceptable grid cell from the hunt mode operations. The system may successively perform hunt mode operations and scan mode operations, compiling information regarding one or more aspects of the scanning process, until one or more termination criteria are satisfied.

27 Claims, 15 Drawing Sheets

(56) References Cited

U.S. PATENT DOCUMENTS

| | | | |
|---|---|---|---|
| 8,107,715 B2 | 1/2012 | Baumfalk et al. | |
| 9,041,791 B2 | 5/2015 | Zahniser | |
| 9,836,839 B2 | 12/2017 | Champlin et al. | |
| 9,851,550 B2 | 12/2017 | Soenksen | |
| 10,061,972 B2 | 8/2018 | Champlin et al. | |
| 10,093,957 B2 | 10/2018 | Pollak et al. | |
| 2005/0162418 A1* | 7/2005 | Kase | G06T 15/08 345/419 |
| 2012/0143372 A1* | 6/2012 | Roh | G05D 1/0274 700/255 |
| 2012/0296180 A1 | 11/2012 | Hyde et al. | |
| 2015/0111216 A1 | 4/2015 | Delahunt et al. | |
| 2015/0187073 A1* | 7/2015 | Stemmer | G06T 5/001 382/131 |
| 2016/0027169 A1* | 1/2016 | Iwadate | G01R 33/482 382/131 |
| 2016/0245748 A1 | 8/2016 | Gasperino et al. | |
| 2017/0161545 A1 | 6/2017 | Champlin et al. | |
| 2017/0211982 A1 | 7/2017 | Lenigk et al. | |
| 2019/0345478 A1* | 11/2019 | Lapotko | G01N 21/636 |
| 2020/0073103 A1* | 3/2020 | Wang | G02B 21/0036 |
| 2020/0242757 A1* | 7/2020 | Potadar | G01N 35/00029 |

OTHER PUBLICATIONS

Mayoore Jaiswal, Matt Horning, Liming Hu, Yau Ben-Or, Cary Champlin, Benjamin Wilson, David Levitz, "Characterization of cervigram image sharpness using multiple self-referenced measurements and random forest classifiers," Proc. SPIE 10485, Optics and Biophotonics in Low-Resource Settings IV, 1048507 (Feb. 13, 2018); doi: 10.1117/12.2292179; located at https://doi.org/10.1117/12.2292179 (abstract only).

Huang J, Rathod V, Sun C, et al. Speed/accuracy trade-offs for modern convolutional object detectors. In: *Proceedings—30th IEEE Conference on Computer Vision and Pattern Recognition*; 2017:7310-7319. Located at http://openaccess.thecvf.com/content_cypr_2017/papers/Huang_SpeedAccuracy_Trade-Offs_for_CVPR_2017_paper.pdf.

Dai J, Li Y, He K, Sun J. R-FCN: Object Detection via Region-based Fully Convolutional Networks. In: *Advances in Neural Information Processing Systems 29*. 2016. Located at https://papers.nips.cc/paper/6465-r-fcn-object-detection-via-region-based-fully-convolutional-networks.pdf.

Ren S, He K, Girshick R, Sun J. Faster R-CNN: Towards Real-Time Object Detection with Region Proposal Networks. *IEEE Trans Pattern Anal Mach Intell*. 2017; 28:1-9. Located at https://arxiv.org/pdf/1506.01497.pdf.

Redmon J, Farhadi A. YOLO9000: Better, faster, stronger. In: *Proceedings—30th IEEE Conference on Computer Vision and Pattern Recognition*; 2017:6517-6525. Located at http://ai2-website.s3.amazonaws.com/publications/PID4749073.pdf.

Krizhevsky A, Sutskever I, Hinton GE. ImageNet classification with deep convolutional neural networks. In: *Advances in Neural Information Processing Systems*; 2012:1097-1105. https://papers.nips.cc/paper/4824-imagenet-classification-with-deep-convolutional-neural-networks.pdf.

Simonyan K, Zisserman A. Very Deep Convolutional Networks for Large-Scale Image Recognition. *arXiv Prepress arXiv14091556*. 2014. https://arxiv.org/pdf/1409.1556.pdf.

He K, Zhang X, Ren S, Sun J. Deep Residual Learning for Image Recognition. In: *Proceedings—29th IEEE Conference on Computer Vision and Pattern Recognition*; 2016:770-778. https://arxiv.org/pdf/1512.03385.pdf.

Basic Malaria Microscopy Learner's Guide. World Health Organization. Located at https://globalhealthtraingcentre.tghn.org/elearning/basic-malaria-microscopy/.

\* cited by examiner (IMAGE FROM THE WORLDWIDE E-LEARNING COURSE ON MALARIA MICROSCOPY, WITH PERMISSION)

(IMAGE FROM THE WORLDWIDE E-LEARNING COURSE ON MALARIA MICROSCOPY, WITH PERMISSION)

(IMAGE FROM THE WORLDWIDE E-LEARNING COURSE ON MALARIA MICROSCOPY, WITH PERMISSION)

AUTOMATED MICROSCOPY SCANNING SYSTEMS AND METHODS

FIELD OF THE DISCLOSURE

The present disclosure relates generally to microscopy, and more specifically, to automated microscopy scanning for improved analysis of samples.

BACKGROUND

Microscopic analysis of biological samples is a core technology in many fields of health care and life sciences. One important field in which microscopy plays a crucial role is the diagnosis and treatment of diseases, such as malaria. Current educational materials of the World Health Organization describe a process for malaria microscopy that involves preparation of a microscopic slide with a blood sample, and staining the blood sample with Giemsa stain to improve visibility.

Conventionally, the blood sample deposited on the microscopic slide includes a thick film and a thin film. The thick film is a thicker portion that contains more blood per given area (e.g. roughly 10-20 red blood cells thick) and is typically used for an initial diagnosis and quantitation of malaria parasites. The thin film is a relatively thinner portion (e.g. ideally a monolayer of red blood cells) and is typically used for confirming the species of the malaria parasites.

Microscopic analyses of the blood sample may be performed manually by qualified personnel, however, automated or semi-automated microscopy systems have also been developed to provide valuable assistance to health care providers and researchers alike. Representative examples of commercially-available automated microscopy systems include the EasyScan Go system by Motic®, and various other commercially-available automated microscopy systems. Although highly desirable results have been achieved using such prior art microscopy systems, there is room for additional advancement and improvement.

SUMMARY

The present disclosure teaches automated microscopy scanning systems and methods for improved analysis of biological samples. In at least some implementations, techniques and technologies in accordance with the present disclosure may identify regions of microscope slides containing a biological sample (e.g. blood), may identify various regions and subregions of the sample that are suitable for microscopic analysis, and may provide a scanning strategy to ensure enough high quality regions of the sample are effectively and efficiently scanned to provide a proper analysis of the sample. In some implementations, such systems may use a machine learning method (e.g. deep learning or other region detection methods) to identify thick and thin film regions of a slide, and boundaries of the thick and thin film regions, based on an initial low-magnification (or macro) image of the slide.

In brief, in at least some implementations, a microscopy system defines a scanning window over a portion of the sample, the scanning window including a plurality of grid cells, each grid cell containing a plurality of fields of view. The system then performs "hunt mode" operations at coarsely-spaced locations throughout the scanning window. More specifically, a microscopic scan is performed at a location, and is evaluated to determine a quality of the scanning result. The system successively scans and evaluates scan results at various coarsely-spaced locations across the sample until an acceptable quality scan result is achieved. The system then performs detailed scans at all fields of view within a grid cell that includes the location having the acceptable scan result. The system performs another evaluation of the scan results for the entire grid cell, and if the scan results for the grid cell are collectively acceptable, then the system proceeds to perform "scan mode" operations. More specifically, the scan mode operations include scanning and evaluating all of the fields of view within one or more grid cells adjacent to the acceptable grid cell from the hunt mode operations. The system then successively performs additional hunt mode operations, and scan mode operations, compiling one or more aspects of the scanning process until one or more termination criteria are satisfied, at which point the scanning process is ended.

More specifically, in at least some implementations, a microscopy system includes a microscope assembly configured for obtaining a microscopic scan of a field of view within a sample, the microscope assembly being operable to perform operations including: define a scanning window over at least a portion of the sample into a plurality of grid cells, wherein individual grid cells of the plurality of grid cells are sized to include a plurality of fields of view; and define a coarsely-spaced grid pattern that includes a plurality of coarsely-spaced grid cells. In at least some implementations, each coarsely-spaced grid cell is non-adjacent to other coarsely-spaced grid cells.

Next, the system performs hunt mode operations including: perform the microscopic scan at a selected field of view within a selected coarsely-spaced grid cell of the plurality of coarsely-spaced grid cells; evaluate a quality of a scan result from the microscopic scan within the selected coarsely-spaced grid cell; and if the quality of the scan result at the selected field of view is not acceptable, select a next coarsely-spaced grid cell as the selected coarsely-spaced grid cell and return to perform the microscopic scan and evaluate the quality of the scan result. The hunt mode operations further include, if the quality of the scan result at the selected field of view is acceptable, then: perform the microscopic scan over all remaining fields of view of the selected coarsely-spaced grid cell; evaluate a quality of the scan results from all remaining fields of view of the selected coarsely-spaced grid cell; assess whether the selected coarsely-spaced grid cell is acceptable based on the quality of the scan results from all fields of view of the selected coarsely-spaced grid cell; if the selected coarsely-spaced grid cell is not acceptable, select a next coarsely-spaced grid cell as the selected coarsely-spaced grid cell and return to perform the microscopic scan and evaluate the quality of the scan results; and if the selected coarsely-spaced grid cell is acceptable, then proceed to scan mode operations.

Next, the microscopic assembly performs scan mode operations including: perform the microscopic scan at all fields of view within one or more adjacent grid cells within a perimeter of grid cells that are adjacent to the selected coarsely-spaced grid cell that is acceptable; evaluate a quality of the scan results from the microscopic scan at all fields of view within the one or more adjacent grid cells; and for each of the one or more adjacent grid cells, if the quality of the scan results is acceptable for the adjacent grid cell, compile one or more aspects of the acceptable scan results with previous acceptable scan results.

Next, the microscope assembly performs operations including, if one or more criteria for terminating scanning operations have not been met, select a next coarsely-spaced grid cell as the selected coarsely-spaced grid cell and return to perform hunt mode operations; and if the one or more criteria for terminating scanning operations have been met, provide an indication of the compiled one or more aspects of the acceptable scan results.

In at least some implementations, the sample comprises at least one of a thick film or a thin film of a blood sample, and wherein one or more criteria for terminating scanning operations comprises: one or more of a total number of acceptable fields of view scanned, a total number of white blood cells counted, a total number of red blood cells counted, a total number of malaria parasites counted, an amount of time elapsed during hunt mode operations, an amount of time elapsed during scan mode operations, or a total amount of time elapsed.

This summary is intended to provide an introduction of a few exemplary aspects of implementations in accordance with the present disclosure. It is not intended to provide an exhaustive explanation of all possible implementations, and should thus be construed as merely introductory, rather than limiting, of the following disclosure.

DETAILED DESCRIPTION

Techniques and technologies for improved microscopy scanning systems for analysis of biological samples will now be disclosed. In the following description, many specific details of certain implementations are described and shown in the accompanying figures. One skilled in the art will understand that the present disclosure may have other possible implementations, and that such other implementations may be practiced with or without some of the particular details set forth in the following description. In addition, it will be appreciated that although various aspects may be described in a particular order, or with respect to certain figures or certain embodiments, it should be appreciated that such aspects may be variously combined or re-ordered to create alternate implementations that remain consistent with the scope of the present disclosure and the claims set forth below.

The present disclosure teaches automated microscopy techniques and technologies for improved analysis of biological samples. More specifically, in at least some implementations, a system in accordance with the present disclosure may autonomously identify regions of microscope slides containing a biological sample (e.g. blood), may identify various regions and subregions of the sample that are suitable for microscopic analysis, and may provide an automated scanning strategy to ensure that enough high quality regions of the sample are effectively and efficiently scanned to provide a proper analysis of the sample. In some implementations, such systems may use a machine learning method (e.g. deep learning or other region detection methods) to identify thick and thin film regions of a slide based on an initial low-magnification (or macro) image of the slide.

In at least some implementations, systems in accordance with the present disclosure may capture high magnification images at various fields of view within a region, and may follow a scanning strategy that takes into account an evaluation of each region's suitability for analysis. Based on the suitability evaluation, a location of the next detailed scan to capture within the sample (thick or thin film) is determined. Such systems may continue automatically capturing and analyzing detailed, high-magnification scans until a pre-defined criteria is satisfied (e.g. a criteria that specifies a total number of white blood cells or red blood cells captured for analysis, etc.).

As described more fully below, techniques and technologies in accordance with the present disclosure may advantageously decrease scanning times by reducing the number of low-quality fields of view scanned, by reducing the time and effort required by the operator to select an appropriate region of the slide, and by reducing the amount of time needed to reject a poor-quality slide. Such techniques and technologies may be particularly valuable for the batch-imaging of many slides, or for performing time-sensitive analyses of biological samples.

Figure 1:
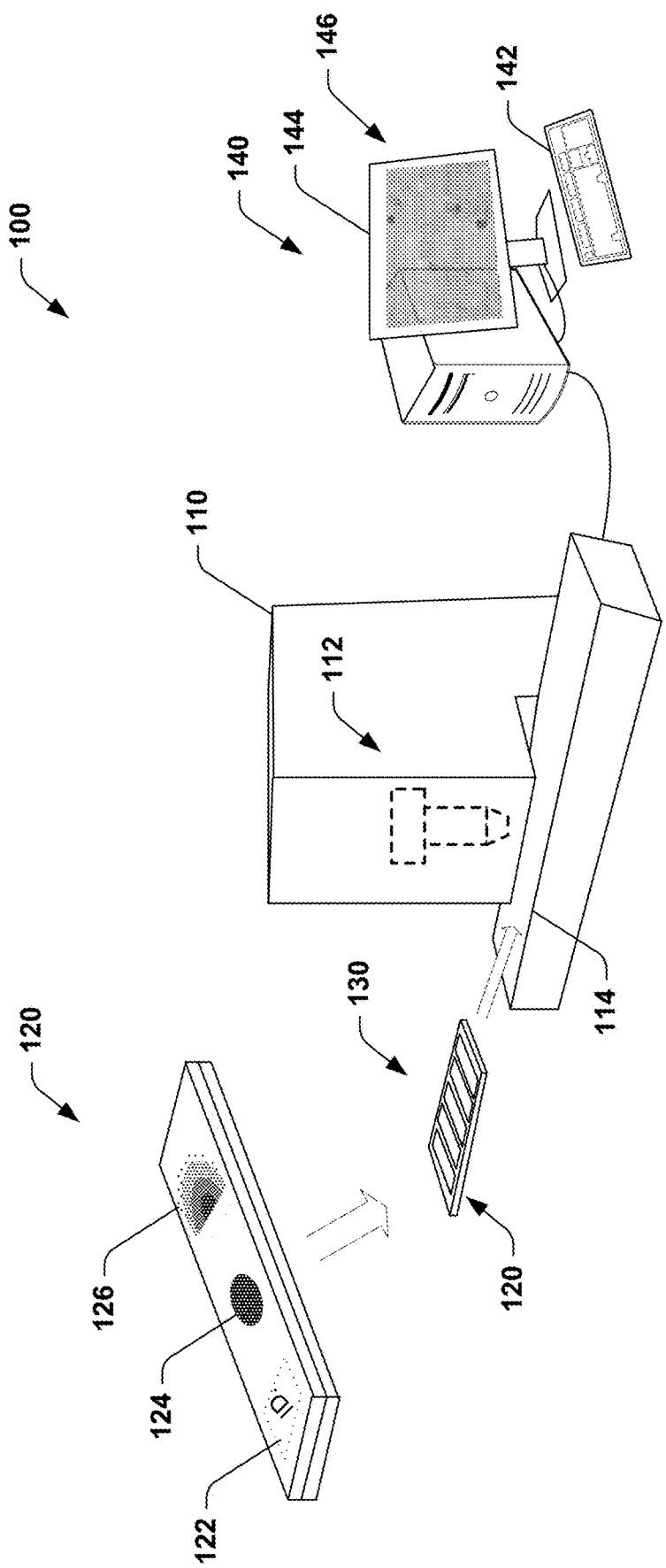
FIG. 1 is a schematic view of a microscopy environment in which techniques and technologies in accordance with the present disclosure may be implemented.

FIG. 1 is a schematic view of a microscopy environment 100 for implementing techniques and technologies in accordance with the present disclosure. In this implementation, the microscopy environment 100 includes an automated microscope assembly 110 having a microscope 112 (shown in dotted lines) for viewing samples on microscopic slides, and a stage 114 for supporting and positioning the slides for microscopic analysis. The automated microscope assembly 110 is representative of many types, models, and varieties of microscopy systems that may be configured and operated (or modified to operate) in accordance with the techniques and technologies disclosed herein, and is described more fully below with respect to FIG. 2.

As further shown in FIG. 1, a slide 120 (enlarged for clarity) includes a biological sample for microscopy. In this implementation, the slide 120 includes a sample of blood that is deposited as a thick film 124 and a thin film 126 in a manner conventional to malaria microscopy. In this implementation, the slide 120 also includes an identifier portion 122 that provides identifying information associated with the sample of blood (e.g. patient, sample type, date, origin, provenance data, etc.). As noted above, the thick film 124 is ideally a thicker portion that contains more blood per given area (e.g. roughly 10-20 red blood cells thick) and is typically used for an initial diagnosis and quantitation of malaria parasites, while the thin film 126 is a relatively thinner portion (e.g. ideally a monolayer of red blood cells) and is typically used for confirming the species of the malaria parasites. Procedures for proper preparation of slides containing blood samples for malaria microscopy are generally known as described, for example, in the "Malaria Microscopy Standard Operating Procedures" of the World Health Organization (e.g. currently available at web address "apps.who.int/iris/handle/10665/274382"). Specialized slide systems also exist for this procedure. See, e.g. U.S. Pat. No. 9,453,996 to Delahunt et al.

As further depicted in FIG. 1, in at least some implementations, the slide 120 may be secured to a slide tray 130 with other slides, and the slide tray 130 may be placed on the stage 114 of the automated microscope assembly 110. The stage 114 may be automated to enable the automated microscope assembly 110 to controllably position the slide 120 for imaging, scanning, and analysis, as described more fully herein. The automated microscope assembly 110 may be operatively coupled to a computing system 140 having a keyboard 142 for inputting user commands, and a display 144 for displaying analysis results, such as high magnification images 146 of the thick and thin films 124, 126 on the slide 120.

Figure 2:
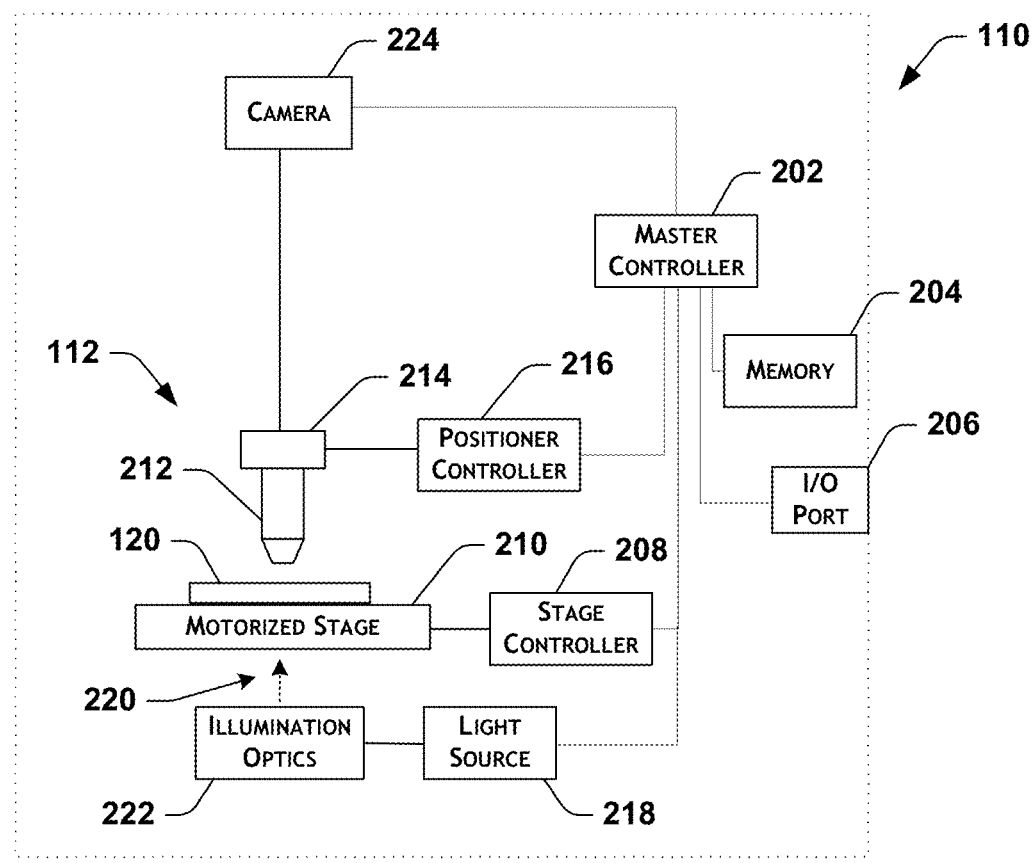
FIG. 2 is a side cross-sectional view of an automated microscope.

FIG. 2 is a side cross-sectional schematic view of the automated microscope assembly 110 of FIG. 1. It will be appreciated that the automated microscope assembly 110 shown in FIG. 2 is just one representative embodiment that may be used for implementing techniques and technologies in accordance with the present disclosure, and that a wide variety of alternate embodiments of microscope assemblies may be suitably employed. In this implementation, the microscope assembly 110 includes a master controller 202 operatively coupled to a memory 204 and to an input/output (I/O) port 206. The master controller 202 typically includes one or more processors and circuitries configured for receiving and interpreting instructions (e.g. stored in memory 204, provided via I/O port 206, etc.), for providing control signals to other components of the automated microscope assembly 110, and for receiving information back from the other components of the automated microscope assembly 110 as needed to perform the techniques and technologies described herein. In alternate implementations, the master controller 202 may be configured to perform at least some of the described operations, while additional operations may be performed by one or more separate processing components operatively coupled to the microscope assembly 110 via the I/O port 206 (e.g. computing system 140 of FIG. 1).

As shown in FIG. 2, the master controller 202 is operatively coupled to a stage controller 208 that controls a motorized stage 210 (e.g. the motorized stage 210 may be at least a portion of stage 114 of FIG. 1) for controllably positioning the slide 120 relative to the microscope 112. In this implementation, the microscope 112 conventionally includes an objective lens assembly 212 operatively coupled to a positioner 214. A positioner controller 216 is operatively coupled to receive control signals from the master controller 202 and to provide signals to the positioner 214 to controllably adjust operations of the objective lens assembly 212, such as adjusting magnification, position, or other operational parameters. In operation, a light source 218 is controlled by the master controller 202 to provide illuminating light 220 via one or more illumination optics 222 to illuminate the blood sample (or other biological sample) on the slide 120. A camera 224 is operatively coupled to receive light or other suitable signals from the microscope 112, and may be controlled by the master controller 202 to obtain images of the sample on the slide 120, which may then be stored in the memory 204 or output to other devices (e.g. computing system 140 of FIG. 1) via the I/O port 206.

As previously noted, the automated microscope assembly 110 is merely one representative embodiment of a microscope assembly suitable for implementing techniques and technologies in accordance with the present disclosure. Other suitable automated microscope assemblies generally include, but are not limited to, those systems commercially-available from Motic®, Zeiss®, Accela®, and BioTek®, and the systems and system types generally disclosed by U.S. Pat. No. 9,851,550 issued to Soenksen, and U.S. Pat. No. 6,049,421 issued to Raz et al. The microscopy scanning system can also be used with image analysis sytems such as described in U.S. Pat. Nos. 9,836,839 and 10,061,972 to Champlin et al.

Figure 3:
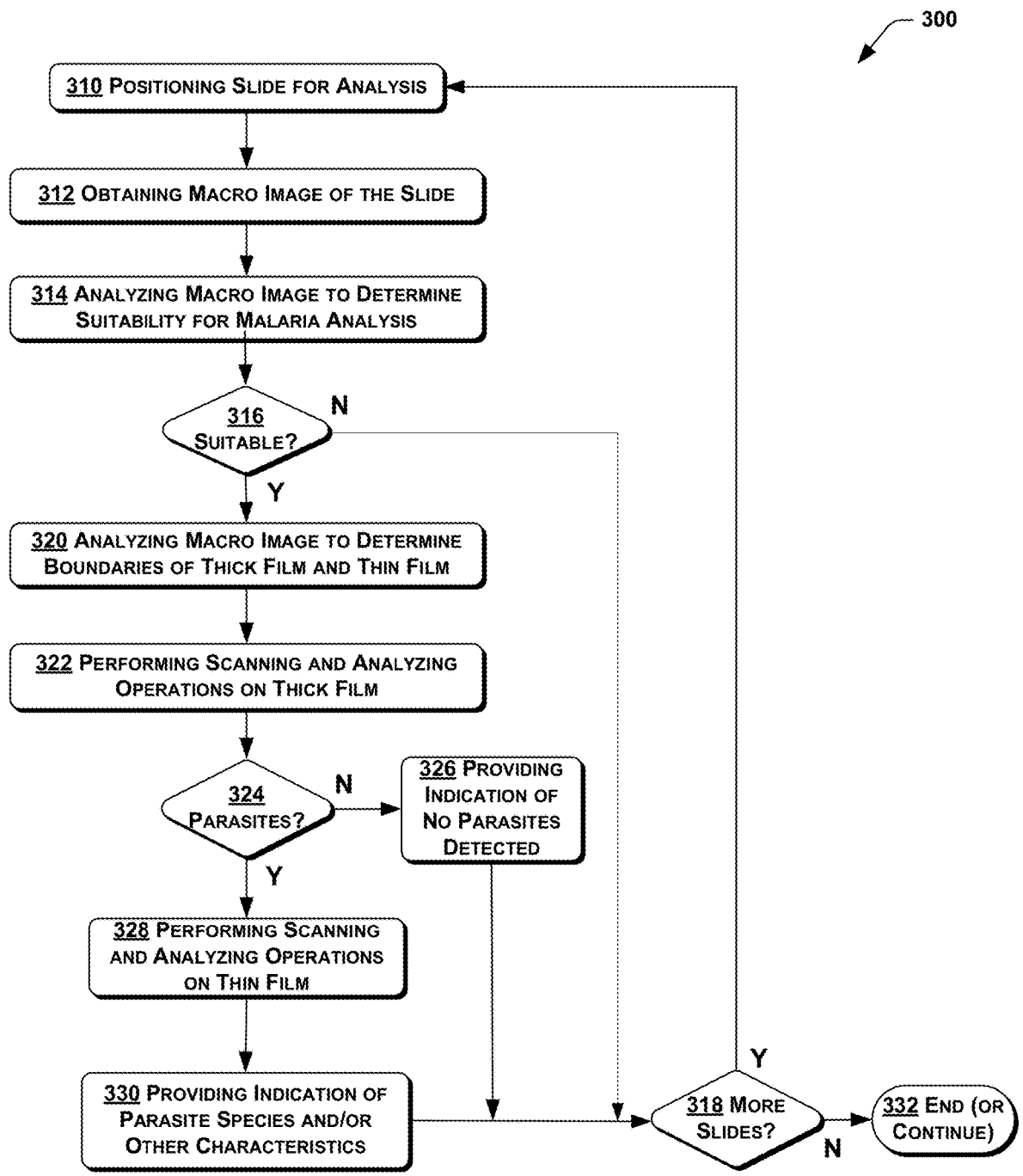
FIG. 3 shows an embodiment of a microscopy process in accordance with the present disclosure.

FIG. 3 shows an embodiment of a microscopy process 300 in accordance with the present disclosure. In this embodiment, the microscopy process 300 includes positioning a slide for analysis at 310, such as by placing the slide 120 onto the motorized stage 210 of the automated microscope assembly 110, and operating the motorized stage 210 to position the slide 120 in a proper position relative to the microscope 112. The process 300 further includes obtaining a "macro image" of the slide at 312, such as by using the camera 224 of the microscope assembly 110. As used herein, the term "macro image" of the slide refers to an image of at least a portion of the slide that shows enough of the biological sample(s) on the slide (e.g. all or substantially all) to enable determination of the position and extent of one or more regions of interest on the slide (e.g. thick film region, thin film region, etc.).

Figure 4:
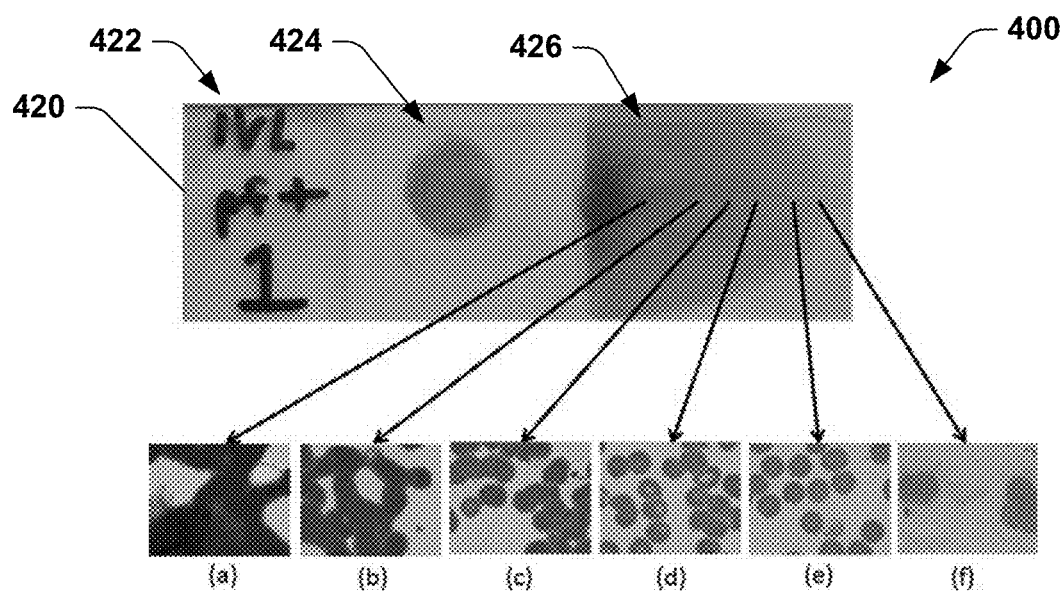
FIG. 4 shows an embodiment of a set of images of a biological sample on a slide.

For example, FIG. 4 shows an embodiment of a set of images of a biological sample, including a macro image 400 of a slide 420 of the type that may be obtained (at 312) by the microscopy process 300. In this embodiment, the slide 420 includes an identifier portion 422 that provides information about the biological sample (e.g. patient name, etc.), a thick film 424 of a patient's blood, and a thin film 426 of the patient's blood, where the thick film 424 and thin film 426 are preferably suitable for the detection and diagnosis of malaria. FIG. 4 also shows a set of six field of view (FOV) images (designated with letters "a" through "f") which represent magnified views of various portions of the thin film 426 of the type that may be obtained using the microscope 112 of the automated microscope assembly 110. From the perspective of the microscopy process 300, the six FOV images may be categorized as being of unacceptable quality for analysis (e.g. FOV images "a," "b", and "f"), or of acceptable quality for analysis (e.g. FOV images "c," "d,"

and "e"). More specifically, in at least some implementations, FOV images "a" and "b" may be considered to lack sufficient definition and clarity of individual cells, while FOV image "f" may contain too few cells and poor cell definition, and may therefore be categorized as unacceptable or unusable for at least some implementations of the microscopy process 300. Additionally, in at least some implementations, FOV images "c" through"e" may be considered to not suffer from these disqualifying characteristics, and may therefore be categorized as acceptable and usable in at least some implementations. It will be appreciated that similar FOV images may be obtained within the thick film 424 of the slide 420, with similar results that some of the FOV images within the thick film 424 may be considered acceptable for at least some implementations of the microscopy process 300, while others may be considered unacceptable, as described more fully below.

Referring again to FIG. 3, the microscopy process 300 further includes analyzing the macro image of the slide to determine a suitability of the slide for malaria analysis at 314. For example, in at least some implementations, the analyzing of the macro image of the slide (at 314) may include performing a suitability analysis process as shown in FIG. 5.

Figure 5:
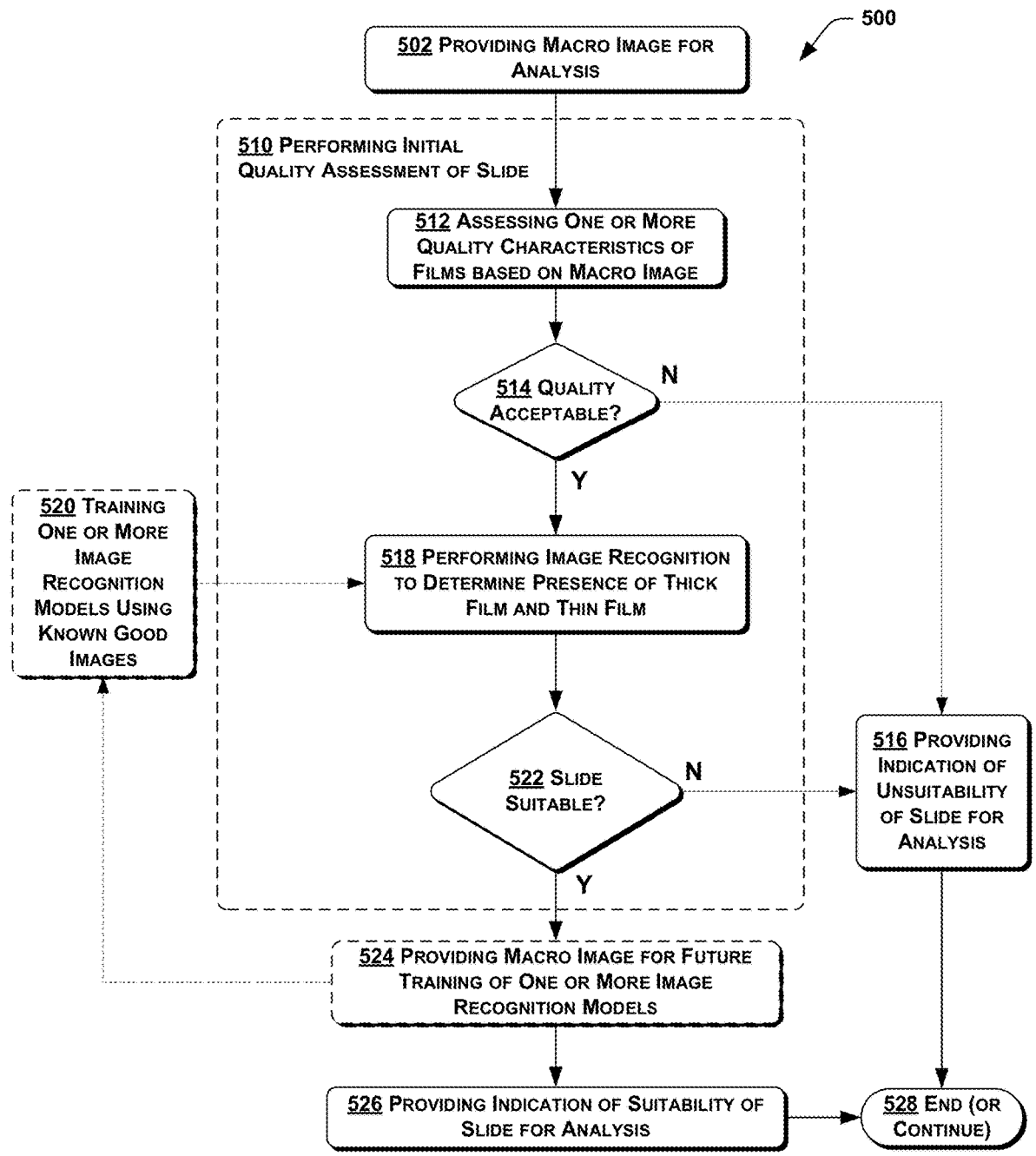
FIG. 5 shows a process for determining a suitability of a slide for analysis in accordance with the present disclosure.

In the embodiment shown in FIG. 5, the process for determining a suitability of a slide for analysis 500 includes providing the macro image of the slide for analysis at 502, and then performing an initial quality assessment of the slide at 510. It will be appreciated that the initial quality assessment (at 510) may involve one or more operations intended as an initial screening of the slide to determine a general suitability of the slide before proceeding to more detailed microscopy operations. For example, in the implementation shown in FIG. 5, the performing the initial quality assessment (at 510) includes assessing one or more quality characteristics of the films based on the macro image at 512. In at least some implementations, the assessing one or more quality characteristics of the films based on the macro image of the slide (at 512) includes determining one or more of composition, exposure, focus, clarity, sharpness, brightness, or any other suitable characteristics. In further implementations, the assessing one or more quality characteristics of the films based on the macro image (at 512) may include assessing a generally known characteristic known as a "Brenner score" (or "Brenner focus score") as disclosed, for example, in U.S. Pat. No. 9,041,791 issued to Zahni ser.

At 514, the process 500 includes determining whether the quality of the slide is initially acceptable based on the assessing of the one or more quality characteristics (at 512). If it is determined that the quality of the slide is not acceptable (at 514), then the process 500 proceeds to providing an indication of an unsuitability of the slide for analysis at 516.

Alternately, if it is determined that the quality of the slide is acceptable (at 514), then the process 500 may include performing image recognition to determine a presence of a thick film and a thin film on the slide at 518. In at least some implementations, the performing image recognition to determine a presence of a thick film and a thin film on the slide (at 518) may involve performing one or more machine learning operations using one or more image recognition models. Such image recognition models are generally known and used in a variety of image-recognition techniques and technologies, as described, for example, in "Deep Learning for Generic Object Detection: A Survey" by Li Liu et al., arXiv:1809.02165 [cs.CV], 6 Sep. 2018.

In brief, in at least some implementations, the machine learning operations may include training one or more image recognition models using known good images of known objects at 520. The one or more image recognition models may include, for example, a Convolutional Neural Network (CNN) model, a Regions with CNN (RCNN) model, a Deep CNN (DCNN) model, a Single Shot Detection (SSD) model, or any other suitable image recognition models. In at least some implementations, an image provided for analysis may be processed to determine which regions of the image (boxes) contain (or do not contain) one or more objects (e.g. a thick film, a thin film, etc.). The determination is based on features extracted from the portions of the image within each region (or box). The features are computed using the one or more image recognition models and that have been trained using known good images containing known objects. The regions are classified as to whether they contain one or more objects. More specifically, in at least some implementations, the regions may be classified as to whether they contain a thick film or a thin film. In this way, in at least some implementations, image recognition to determine a presence of the thick film and the thin film on the slide may be performed (at 518) using machine learning operations.

The initial quality assessment of the slide (at 510) shown in FIG. 5 further includes determining whether the slide is suitable for further analysis (e.g. the slide includes both a thick film and a thin film) at 522. If it is determined that the slide is not suitable (e.g. does not include both thick and thin films) (at 522), then the process 500 proceeds to providing an indication of an unsuitability of the slide for analysis at 516. In another implementation, the determination that the image does not include a thick film (regardless of the presence or absence of a thin film) causes the process to proceed to providing an indication of unsuitability. In yet other implementations not specific to conventional malaria microscopy, the determination that the image does not include other types of biological samples, e.g. tissue sections, causes the process to proceed to providing an indication of unsuitability.

Alternately, if it is determined that the slide is suitable (e.g. includes both thick and thin films) (at 522), then the process 500 may optionally include providing the macro image for future training of the one or more recognition models at 524. The suitability assessment process 500 then proceeds to providing an indication of suitability of the slide for analysis at 526. Finally, after providing the indication of suitability (at 526), or after providing the indication of unsuitability (at 516), the process 500 ends or continues to other operations at 528.

Returning again to FIG. 3, after analyzing the macro image of the slide (at 314), the microscopy process 300 further includes determining whether the slide is suitable for malaria analysis at 316 (e.g. based on the results from the suitability analysis process 500). If it is determined that the slide is not suitable for malaria analysis (at 316), the process 300 proceeds to determining whether there are more slides available for analysis at 318, and if so, then the process 300 returns to positioning a new slide for analysis at 310, and the above-described operations 310 through 316 are repeated for the new slide.

Alternately, if it is determined that the slide is suitable for malaria analysis (at 316), then the process 300 proceeds to analyzing the macro image of the slide to determine the boundaries of the thick film and the thin film at 320. Techniques for automatic detection of biological sample boundaries on a microscopic slide (e.g. thick film 424, thin film 426) using automated microscope assemblies are generally known and include, but are not limited to, the sample boundary determination capabilities of the commercially-available products of Motic®, or the techniques and technologies generally disclosed by U.S. Pat. No. 7,151,246 issued to Fein et al., U.S. Pat. No. 7,558,415 issued to McLaren et al., U.S. Pat. No. 8,107,715 issued to Baumfalk et al., and U.S. Pat. No. 10,093,957 issued to Pollak et al.

With continued reference to FIG. 3, the microscopy process 300 further includes performing scanning and analyzing operations on the thick film at 322. The scanning and analyzing operations performed on the thick film (at 322) may include a number of detailed operations that may be performed in a variety of suitable implementations, and will described more fully below with respect to the accompanying figures. In brief, in at least some implementations, the scanning and analyzing operations performed on the thick film (at 322) may include one or more preparatory operations, followed by so-called "hunt mode" operations that involve evaluating microscopic images at a number of different locations across the desired biological sample (e.g. thick film 424, thin film 426, etc.) at various locations that are relatively coarsely spaced apart. Once an acceptable location is identified that provides (or initially appears to provide) an acceptable quality of microscopic scanning results using the hunt mode operations, the operations (at 322) may then perform so-called "scan mode" operations in which detailed scanning of microscopic images are performed at relatively closely-spaced locations proximate to the acceptable location determined from the hunt mode. After the detailed scan mode operations are successfully performed, the operations (at 322) may return to hunt mode operations, and may continue to iterate between hunt mode operations and scan mode operations until one or more desired criteria have been satisfied. Additional details of various possible implementations of the scanning and analyzing operations performed on the thick film (at 322) are described more fully below.

In the implementation shown in FIG. 3, the microscopy process 300 further includes determining whether malaria parasites are present within the thick film at 324. The determination (at 324) may be based on the results of the scanning and analyzing operations on the thick film (at 322), which may generally involve automated image-recognition techniques and technologies that are configured to detect and count features that are present within biological samples, including cells and malaria parasites that may be present within a blood sample. Such automated image-recognition techniques and technologies have been implemented in commercially-available systems, including but not limited to the commercially-available systems of Motic® (e.g. Easy Scan Go system).

If it is determined (at 324) that there are no malaria parasites (or a relatively low number of malaria parasites below an established threshold) present within the thick film 424, then the microscopy process 300 may include providing an indication of no parasites detected (or an insufficient number of parasites detected) at 326, and then the microscopy process 300 may proceed to determining whether there are more slides available for analysis (at 318). In some implementations, the process may be completed after the thick film is read regardless of whether parasites were detected or not, providing an indication of whether parasites were detected or not.

On the other hand, if it is determined (at 324) that malaria parasites are present within the thick film 424, then in some implementations the microscopy process 300 proceeds to performing scanning and analyzing operations on the thin film at 328. Again, it will be appreciated that the scanning and analyzing operations performed on the thin film (at 328) may include a number of detailed operations that may be performed in a variety of suitable implementations, and will described more fully below with respect to the accompanying figures. In brief, in at least some implementations, the scanning and analyzing operations performed on the thin film (at 328) may follow a generally similar approach to the scanning and analyzing operations performed on the thick film (at 322), may include one or more preparatory operations, followed by so-called "hunt mode" operations at various locations that are relatively coarsely spaced apart, and then followed by one or more "scan mode" operations once an acceptable location is determined using the hunt mode. Additional details of various possible implementations of the scanning and analyzing operations performed on the thin film (at 328) are described more fully below.

With continued reference to FIG. 3, after performing scanning and analyzing operations on the thin film (at 328), the microscopy process 300 includes providing an indication of one or more parasite species and/or one or more other characteristics of the biological sample at 330. In at least some implementations, the microscopy process 300 then proceeds to determining whether there are more slides available for analysis at 318, and if so, then the process 300 returns to positioning a new slide for analysis at 310, and the above-described operations 310 through 330 are repeated for the new slide. Finally, once it is determined that there are no more slides available for analysis (at 318), the microscopy process 300 ends or continues to other operations at 332.

As indicated above, the scanning and analyzing operations performed on the thick film (at 322) may include a number of detailed operations that may be performed in a variety of suitable implementations. For example, in the implementation shown in FIG. 6, a scanning and analyzing process 600 includes performing preparatory operations at 605. In at least some implementations, the preparations operations performed at 605 may include establishing a scanning window for scanning a biological sample at 610. The establishing of the scanning window (at 610) may include determining a portion of the thick film 424 that may be subject to detailed scanning operations using the automated microscope assembly 110. It will be appreciated that the scanning window established at 610 is preferably (but not necessarily) a relatively small portion of the thick film 424, and is preferably located to provide relatively high quality field of view (FOV) images to enable the desired microscopy analysis to be performed, and desired information obtained, with as few operations of the automated microscope assembly 110 as practical. Although the following description of the scanning and analyzing process 600 is described below with specific reference to performing operations on the thick film 424, it should be appreciated that in alternate implementations, the scanning and analyzing process 600 may also be applied to the thin film 426 of the slide 420, or to a variety of other suitable biological samples that may be subject to automated microscopy analysis.

In at least some implementations, the establishing of the scanning window (at 610) may be automatically determined based on the boundaries of the thick film 424 (determined at 320). In some implementations, the scanning window may be established as a relatively small scanning region centered at an approximate center of the thick film 424. Additionally, the scanning window may be established (at 610) based on an input received from an external device, such as an input from a user (e.g. technician, health care worker, etc.) of the automated microscope assembly 110, or from a user of the computing system 140 (e.g. using keyboard 142), or an input from another device (e.g. via I/O port 206). Moreover, for instances wherein the biological sample is relatively uniform, such as a relatively uniform thick film, the location of the scanning window may be positioned at approximately the center of the thick film 424, or at any other suitable location within the thick film.

In still other implementations, the location of the scanning window may be established based on an automated analysis of the macro image 400 of the thick film 424, and automated selection of a location having a relatively improved chance of containing a suitable number of field of view (FOV) images that will be categorized as having acceptable quality for analysis. For example, in some implementations, the location of the scanning window may be automatically established (at 610) by analyzing the macro image 400 of the thick film 424, and selecting a region of the thick film 424 that avoids or minimizes the relatively darker portions of the thick film 424 that may provide FOV images that lack sufficient definition, and also that avoids or minimizes relatively lighter portions of the thick film 424 that may provide FOV images that may contain too few cells. Thus, the establishing of the scanning window (at 610) may include automated analysis of the thick film 424 to determine a position of the scanning window that captures an area having a relatively higher probability of providing acceptable FOV images. For example, in at least some implementations, the scanning window location may be based on an analysis of the relative intensities of possible FOV images within a possible scanning window area, and an area of relatively moderate darkness (e.g. an area having a greater number of possible FOV images having an average light transmissivity) may be selected such that the scanning window provides a relatively greater chance of containing field of view images that will be categorized as having acceptable quality for analysis.

It will be appreciated that the size and shape of the scanning window (established at 610) may be any suitable size and shape, and may vary from slide to slide (or from film to film on the same slide) depending on the particular biological samples being analyzed (e.g. thick film 424, thin film 426, other non-blood samples, etc.). As noted above, the scanning window may preferably be a relatively small area that provides relatively high quality FOV images to enable the desired microscopy analysis to be performed, and desired information obtained, with as few operations of the automated microscope assembly 110 as practical. Thus, the size and shape of the scanning window that may at least partially promote, effectuate, or increase the likelihood of satisfying one or more of these goals, may change depending upon the characteristics of the thick film 424 or other region on the slide being scanned.

Figure 7:
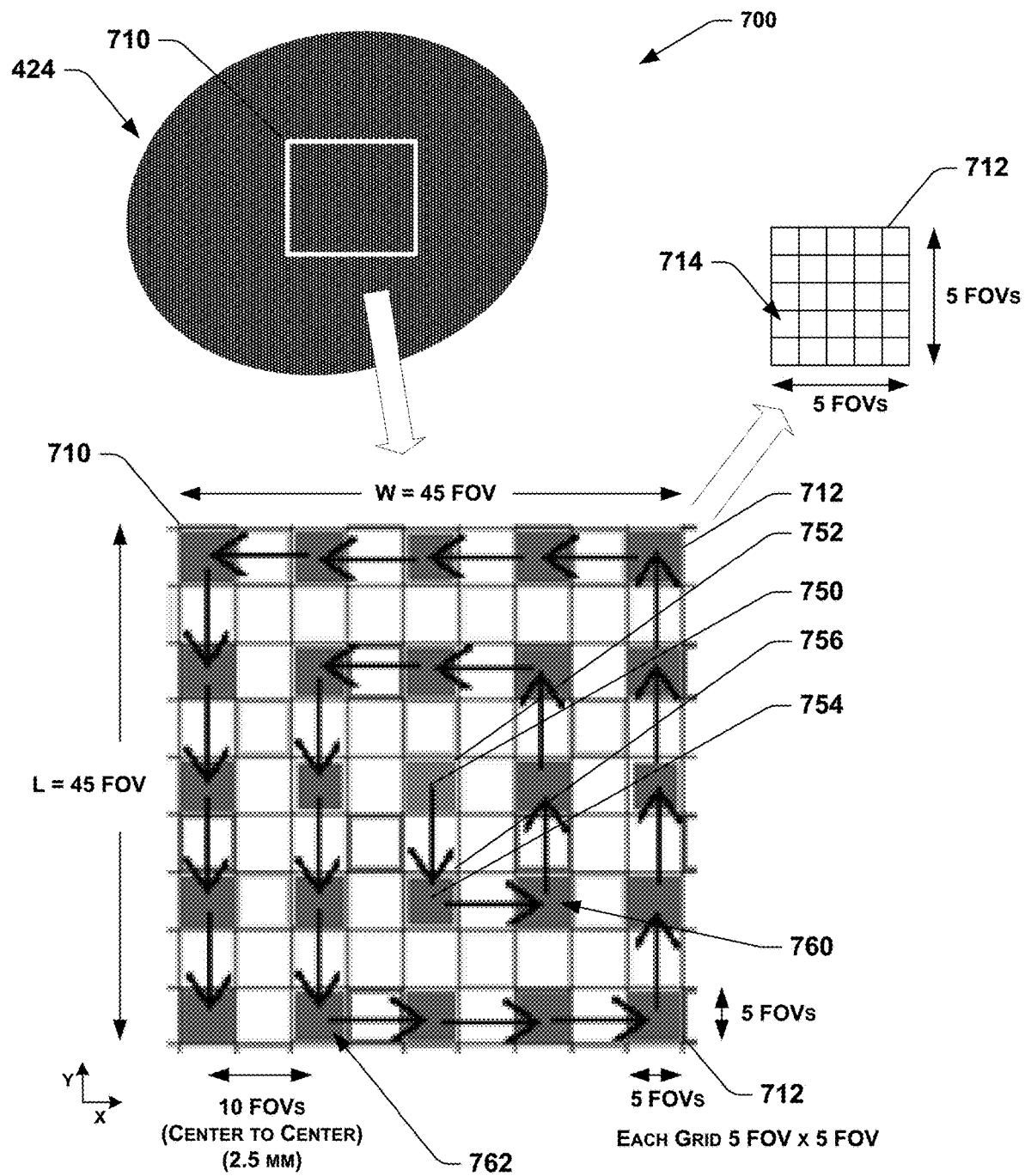
FIG. 7 shows a schematic representation of a scanning window positioned over a thick film in accordance with the present disclosure.

In at least some implementations, the scanning window may be a square (or rectangular) shape. For example, FIG. 7 shows a schematic representation 700 of a scanning window 710 having a square shape established on the thick film 424 (at 610). In this particular embodiment, the scanning window 710 has a width W of 45 fields of view (e.g. 11.25 mm) and a length L of 45 fields of view (e.g. 11.25 mm). It will be appreciated that, in alternate embodiments, the scanning window 710 may have other suitable dimensions. For example, in some embodiments, a biological sample (e.g. thin film 426) may span across the entire width of the slide 420, and therefore, the scanning window 710 may span across the entire width of the slide 420 (e.g. typically 25 mm). In some embodiments, the dimensions of the scanning window may be predetermined (e.g. 11.25 mm by 11.25 mm), or alternately, may be dynamically determined (larger or smaller) based upon one or more results from the analysis of the macro image 400 of the thick film 424 with the goal of selecting dimensions to provide a scanning window having a relatively greater chance of containing a suitable number of field of view images acceptable for analysis.

Figure 6:
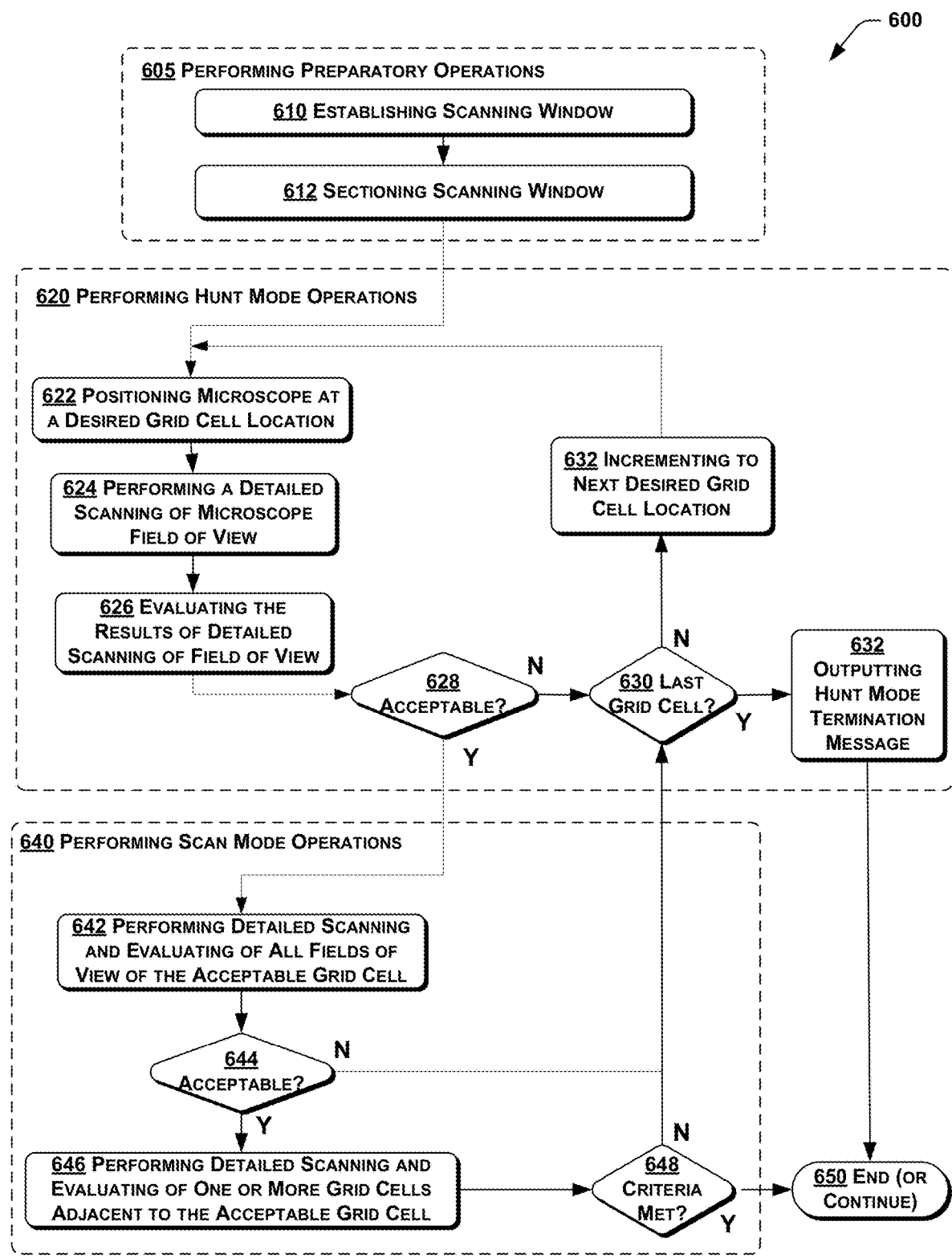
FIG. 6 shows a scanning and evaluating process in accordance with the present disclosure.

As further shown in FIG. 6, the scanning and analyzing process 600 further includes sectioning the scanning window at 612. It will be appreciated that the sectioning of the scanning window (at 612) includes a mathematical sectioning or defining of the scanning window into a plurality of smaller portions. More specifically, sectioning of the scanning window (at 612) may include sectioning the scanning window 710 into a plurality of smaller portions, wherein the smaller portions (or sub-sections) are referred to herein as "grid cells." For example, in the embodiment shown in FIG. 7, the scanning window 710 has been sectioned into a plurality of grid cells 712. In some implementations, each grid cell 712 may be a square, while in other implementations, each grid cell 712 may be rectangular or other suitable shape. In the depicted embodiment, the size of each grid cell 712 is five fields of view wide and five fields of view in length and width (i.e. 5 FOVs×5 FOVs), for a total of twenty five fields of view per grid cell 712. In at least some implementations, an individual field of view may have a rectangular shape, and accordingly, the grid cell 712 may also have a rectangular shape. In an upper right hand portion of FIG. 7, a grid cell 712 has been enlarged to show the individual fields of view (FOV) 714 (e.g. of the microscope 112 of the automated microscope assembly 110), and in the depicted embodiment, the grid cell 712 includes 25 FOVs 714. Therefore, in the embodiment shown in FIG. 7, the scanning window 710 is sectioned into nine grid cells 712 wide and nine grid cells 712 in length for a total of eighty one grid cells 712. Of course, in alternate embodiments, a wide variety of suitable sectioning arrangements may be conceived in accordance with the scope and teachings of the present disclosure.

Referring again to FIG. 6, the scanning and analyzing process 600 further includes performing hunt mode operations at 620. As noted above, the hunt mode operations (at 620) generally involve evaluating the quality of microscopic images at a number of different locations across the thick film 424 (or thin film 426 or other biological sample) based on a relatively coarse spacing of locations. More specifically, in at least some implementations, the performing hunt mode operations (at 620) includes positioning the microscope at a desired grid cell location at 622. For example, as shown in FIG. 7, the microscope 112 may initially be positioned so that the field of view of the objective lens 212 is at a center field of view (FOV) 750 of a center grid cell 752 of the scanning window 710 (e.g. approximately the center of the thick film 424). In at least some implementations, the positioning of the microscope (at 622) may also include one or more focusing or re-focusing operations (e.g. using position controller 216, positioner 214, etc. of the microscope assembly 110).

It will be appreciated that, depending upon the particular details of the sectioning of the scanning window (at 612), in some implementations, some grid cells may have a field of view (FOV) located at the center of the grid cell while others may not, and may only have a FOV that is near the center of the grid cell. More specifically, in some implementations, those grid cells that have been sectioned into an equal number of odd rows of FOVs and odd columns of FOVs will have a center FOV (e.g. 5 FOVs×5 FOVs, 7 FOVs×7 FOVs, 3 FOVs×3 FOVs, etc.), while other configurations of sectioning (e.g. 4 FOVs×5 FOVs, 4 FOVs×4 FOVs, 6 FOVs×6 FOVs, etc.) may not have a center FOV but may have one or more FOVs that are near (e.g. adjacent) to the center of the grid cell. Therefore, it should be understood that reference in the following discussion to a center FOV (or approximately center FOV) should be understood to include such alternate implementations that have an FOV that is near (e.g. adjacent) to the center of the grid cell, but which may not be at a precise center of the grid cell. In further implementations, it will be appreciated that the desired grid cell location (at 622) is not necessarily the center FOV, and that other FOVs may be chosed as the desired grid cell location (e.g. the top left hand corner FOV of the grid cell, etc.), and that virtually any other FOV of the grid cell may be selected as the desired grid cell location (at 622).

Figure 8:
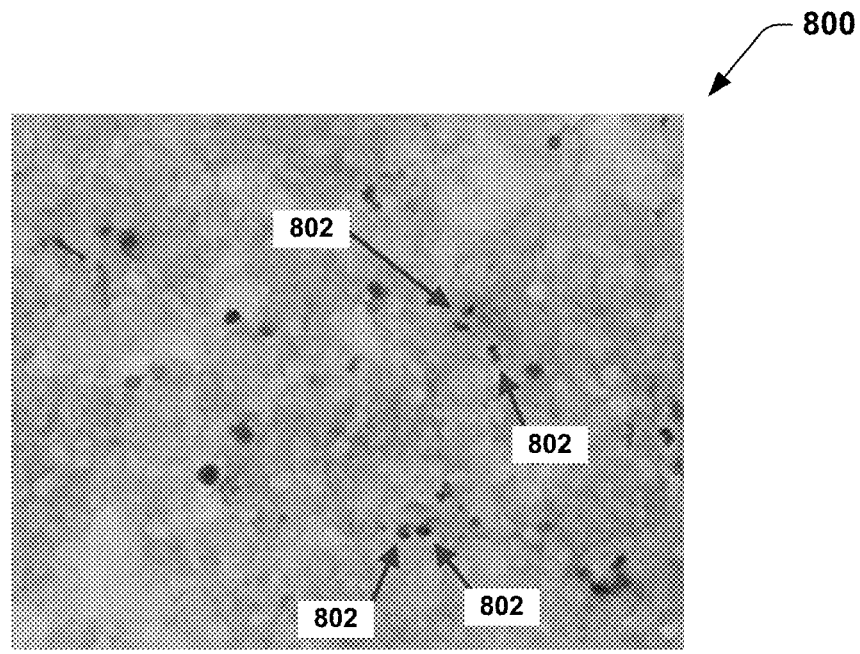
FIG. 8 shows representative scanning results of the type obtained during a detailed scanning of the thick film.

After positioning the microscope (at 622), the scanning and analyzing process 600 further includes performing a detailed scanning of the microscope field of view at the desired grid cell location at 624. The detailed scanning of the microscope field of view (performed at 624) may be a conventional scanning process that is generally known and readily performed by automated microscope assemblies (e.g. microscope assembly 110), including the existing automated microscope assemblies of the type noted elsewhere herein. For example, FIG. 8 shows a representative scanning results 800 of the type that may be obtained during the detailed scanning of the thick film (at 624). Again, in at least some implementations, the performing of the detailed scanning of the field of view (at 624) may include one or more focusing or re-focusing operations (e.g. using position controller 216, positioner 214, master controller 202, etc. of the microscope assembly 110).

As further shown in FIG. 6, the scanning and analyzing process 600 further includes evaluating the results of the detailed scanning the field of view at 626. In at least some implementations, the evaluating of the results of the detailed scanning (at 626) may include evaluating a suitability of the scanning results. More specifically, the suitability of the scanning results for a thick film may be evaluated based on one or more quality characteristics of the scanning results, including but not limited to, determining one or more of composition (i.e. is the FOV empty?), exposure, focus, number of white blood cells, bubbles, large stain aggregations, dirt on the slide, clarity, sharpness (or blurriness), brightness, or any other suitable quality characteristics. In at least some implementations, the evaluating of the results of the detailed scanning (at 626) may include using known automated image-recognition techniques and technologies, as described more fully above with reference to, for example, in "Deep Learning for Generic Object Detection: A Survey" by Li Liu et al., arXiv:1809.02165 [cs.CV], 6 Sep. 2018.

In addition, in at least some implementations, the evaluating of the results of the detailed scanning of the field of view (at 626) may include counting a number of features that are present or detectable within the field of view. More specifically, in at least some implementations, the evaluating (at 626) may including counting a number of red blood cells (RBCs), white blood cells (WBCs), malaria parasites (MPs), or any other suitable features within the field of view. In the representative thick film scanning results 800 of FIG. 8, a plurality of malaria parasites 802 are shown that may be readily detected and counted using known techniques and technologies. It will be appreciated that the detection and counting of such features (e.g. RBCs, WBCs, MPs, etc.) may be readily accomplished using known automated image-recognition techniques and technologies, as described more fully above. In addition, such automated image-recognition techniques and technologies have been implemented in commercially-available systems for detecting and counting features that are present within biological samples (e.g. counting blood cells and malaria parasites), including but not limited to the commercially-available systems of Motic® (e.g. EasyScan Go system).

In at least some implementations, the evaluating of the results of scanning the field of view (at 626) may include providing a quality assessment of the scanning results associated with the field of view. For example, the evaluating (at 626) may provide a quality assessment score or numerical designation. In some implementations, a quality assessment score may be provided as follows: 0=good, 1=blurry, 2=empty, and 3=RBCs are too clumped (or indistinct). In this particular implementation, only a quality assessment score of zero is considered acceptable or of sufficiently high quality. In alternate implementations, the quality assessment may provide a non-quantitative result, such as "acceptable," "unacceptable," "high quality," "low quality," or any other suitable non-quantitative descriptor.

Referring again to FIG. 6, after evaluating the results of the detailed scanning of the field of view (at 626), the scanning and analyzing process 600 further includes determining whether the results of the detailed scanning of the field of view are acceptable at 628. If it is determined that the results of the detailed scanning of the field of view are not acceptable (at 628) (e.g. blurry, empty, not enough cells, etc.), then the scanning and analyzing process 600 next determines whether the field of view that has just been scanned is the last grid cell available for the hunt mode operations at 630. If it is determined that the field of view that has just been scanned is the last grid cell available for the hunt mode operations (at 630), then the scanning and analyzing process 600 proceeds to outputting a hunt mode termination message at 632, and performing of the hunt mode operations (at 620) is ended by proceeding to end or continue to other operations at 650, such as returning to appropriate operations of the microscopy process 300 of FIG. 3.

Alternately, if it is determined (at 630) that the field of view that has just been scanned is not the last grid cell available for performing the hunt mode operations, then the scanning and analyzing process 600 includes incrementing to a next desired grid cell location at 632, and the performing of hunt mode operations (at 620) returns to positioning the microscope at the next desired grid location (at 622), and the above-described hunt mode operations 622 through 628 are repeated for the new desired grid location.

It will be appreciated that the incrementing to the next desired grid cell location (at 632) for continuing hunt mode operations may be accomplished in a variety of suitable ways. In at least some implementations, the incrementing to the next desired grid cell location (at 632) may be accomplished as schematically depicted in FIG. 7. More specifically, the next desired grid cell location may be selected by skipping a grid cell that is adjacent to the center grid cell 752, and moving outwardly to a center (or center FOV) 754 (or other desired grid cell location) of a non-adjacent grid cell 756, and then performing the above-noted hunt mode operations (622-628) at the desired grid cell location (e.g. center FOV 754) of the non-adjacent grid cell 756. Although the hunt mode operations (622-628) are initially described as occurring at coarsely-spaced grid cell locations wherein the grid cell locations are described as non-adjacent (e.g. as shown in FIG. 7), it should be appreciated that in other implementations, at least some of the coarsely-spaced grid cells may be adjacent to other coarsely-spaced grid cells, or a combination of adjacent and non-adjacent grid cells may be employed, as described more fully below with reference to FIGS. 19 and 20.

As shown in FIG. 7, in at least some implementations, the non-adjacent grid cell 756 is part of a first set of non-adjacent grid cells 760 that form a first non-adjacent perimeter around the center grid cell 752 (i.e. a perimeter of grid cells that are spaced apart from the center grid cell 752 by a distance of one grid cell). In addition, as further shown in FIG. 7, a second set of non-adjacent grid cells 762 may be identified that form a second non-adjacent perimeter around the center grid cell 752 (the second non-adjacent perimeter being spaced outwardly by one grid cell from the first non-adjacent perimeter). It will be appreciated that in alternate implementations, the sectioning of the scanning window (at 612) may be performed in a variety of ways to provide any desired number of grid cells, and therefore any desired number of perimeters of grid cells formed about the center grid cell 752.

As the hunt mode operations 620 continue to repeatedly increment to a next desired grid cell location (at 632) in an attempt to locate a grid cell having an acceptable quality (at 628), in at least some implementations, the next desired grid cell location may be selected (at 632) by proceeding around the first non-adjacent perimeter (e.g. counter-clockwise as shown in FIG. 7), selecting every other grid cell (i.e. skipping one and selecting the next one) of the first set of non-adjacent grid cells 760. The above-described operations 622 through 628 are then performed at the center (or center field of view) of the next desired grid cell location. After traversing completely around the first non-adjacent perimeter, the next desired grid cell location may be determined (at 632) by moving outwardly to the second set of non-adjacent grid cells 762 that form the second non-adjacent perimeter, and then proceeding around the second non-adjacent perimeter (e.g. counter-clockwise as shown in FIG. 7), selecting every other grid cell (i.e. skipping one and selecting the next one) of the second set of non-adjacent grid cells 762. Thus, in at least some implementations, the detailed scanning and analyzing operations (at 622, 624) are performed on a relatively coarse set of FOV locations (i.e. the center FOVs of every other grid cell) that are spaced apart by approximately two grid cell dimensions (e.g. 2×5 FOVs=10 FOVs).

It will be appreciated that in alternate implementations, the hunt mode operations (at 620) may repeatedly increment to a next desired grid location (at 632) by proceeding around any number of non-adjacent grid perimeters (e.g. 3, 4, etc.). Similarly, in alternate implementations, the hunt mode operations (at 620) may repeatedly increment to a next desired grid location (at 632) by proceeding in any desired direction around the first and second non-adjacent perimeters 760, 762 (e.g. clockwise), or by alternately proceeding in a first direction (e.g. clockwise) around one of the perimeters (e.g. first perimeter) and then by proceeding in an opposite direction (e.g. counter-clockwise) around the other perimeter.

Figure 19:
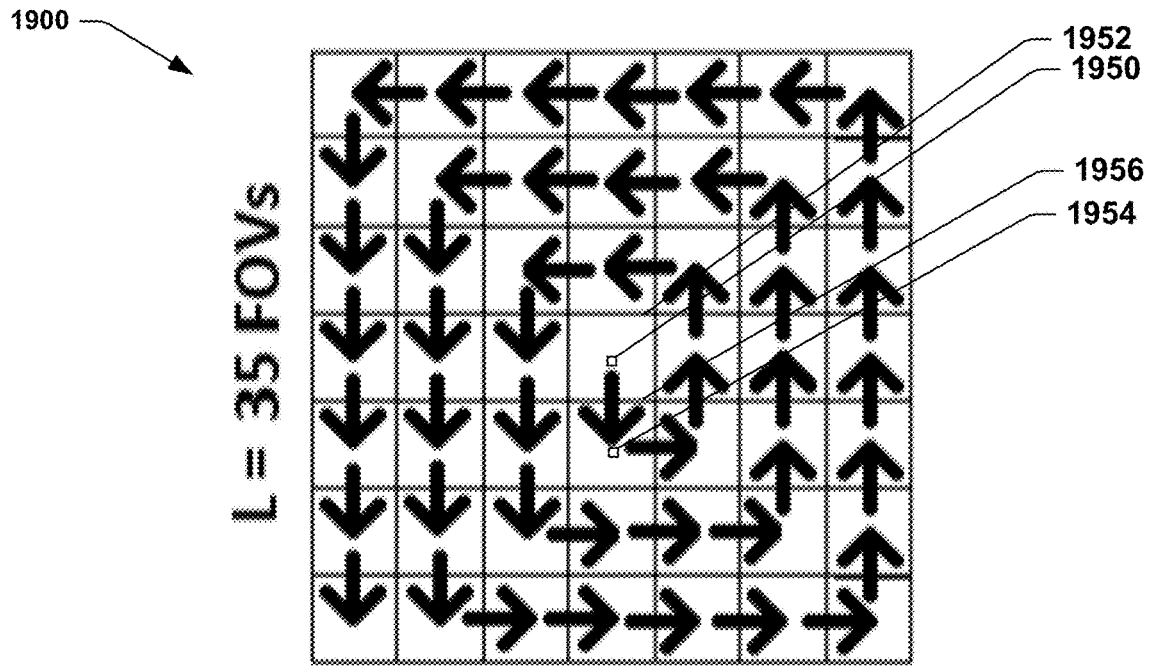
FIGS. 19 and 20 show alternate embodiments of coarsely-spaced grid cells in accordance with the present disclosure.

As noted above, the coarsely-spaced grid cells used during hunt mode operations are not required to be non-adjacent, and may in alternate implementations be adjacent grid cells, or a combination of adjacent and non-adjacent grid cells. Therefore, the reference to coarsely-spaced grid cells may include desired FOVs (e.g. center FOVs) of even some adjacent grid cells. For example, FIG. 19 shows an embodiment of coarsely-spaced grid cells 1900 having adjacent grid cells 1912 in accordance with the present disclosure. In at least some implementations, the incrementing to the next desired grid cell location (at 632) may be accomplished as schematically depicted in FIG. 19. More specifically, after analyzing a desired FOV (e.g. center FOV) 1950 of a center grid cell 1952, the incrementing (at 632) may proceed to the next desired FOV (e.g. center FOV) 1954 of the first grid cell 1956, and then performing the above-noted hunt mode operations (622-628) at the desired grid cell location (e.g. center FOV 1954) of the adjacent grid cell 1956, and may then proceed from desired FOV to desired FOV around one or more perimeters of grid cells that are adjacent to the center grid cell 1952 (and adjacent to each other), moving outwardly in a generally spiral manner (counterclockwise or clockwise) as depicted by the arrows in FIG. 19.

Figure 20:
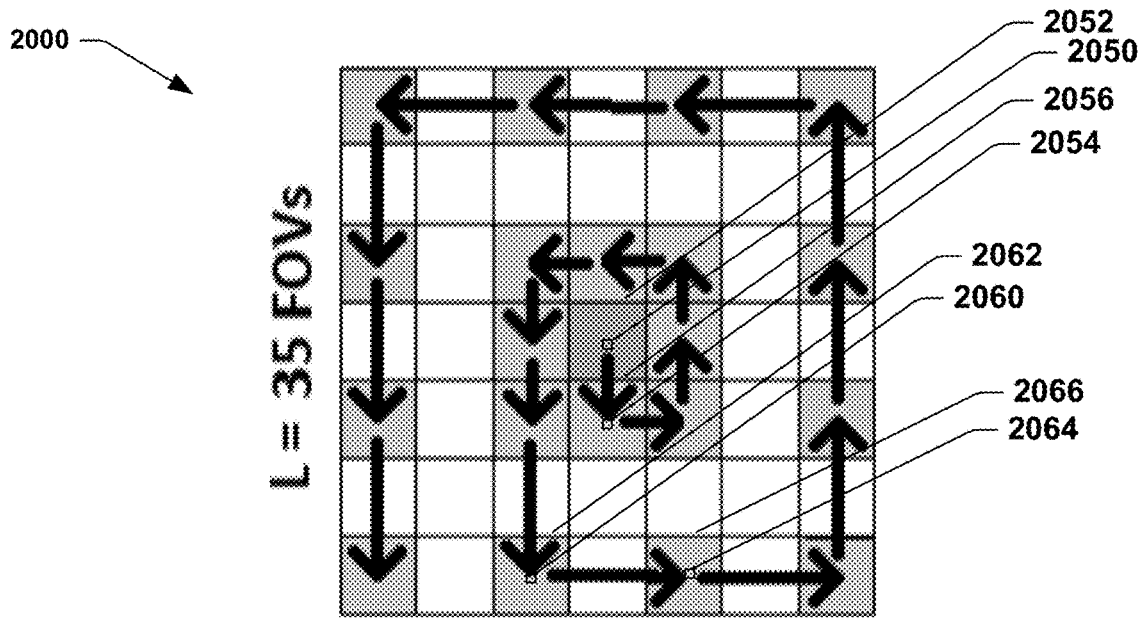

Alternately, FIG. 20 shows an embodiment of coarsely-spaced grid cells 2000 having some adjacent grid cells and some non-adjacent grid cells in accordance with the present disclosure. In at least some implementations, the incrementing to the next desired grid cell location (at 632) may be accomplished as schematically depicted in FIG. 20. More specifically, after analyzing a desired FOV (e.g. center FOV) 2050 of a center grid cell 2052, the incrementing (at 632) may proceed to the next desired FOV (e.g. center FOV) 2054 of the first adjacent grid cell 2056, and then performing the above-noted hunt mode operations (622-628) at the desired grid cell location (e.g. center FOV 2054) of the adjacent grid cell 2056, and may then proceed from desired FOV to desired FOV around the perimeter of grid cells that are adjacent to the center grid cell 2052 (and adjacent to each other). After proceeding around the entire perimeter of adjacent grid cells, the incrementing may proceed outwardly to an outer perimeter of non-adjacent grid cells, starting with a desired FOV 2060 of a first non-adjacent grid cell 2062, and then incrementally proceeding to a next desired FOV 2064 of a next non-adjacent grid cell 2066, proceeding around the second perimeter (counterclockwise or clockwise) as depicted by the arrows in FIG. 20.

Referring again to FIG. 6, when it is determined (at 628) that the results of the detailed scanning of the center field of view of the desired grid cell are acceptable, and therefore an acceptable grid cell has been located, then the scanning and analyzing process 600 proceeds from the hunt mode operations (at 620) to performing "scan mode" operations at 640. The scan mode operations (at 640) include, in at least some implementations, performing detailed scanning and evaluating of all fields of view within the acceptable grid cell at 642. In at least some implementations, the detailed scanning (at 642) may be substantially similar to the detailed scanning performed during the hunt mode operations (at 624) described above, and the evaluating (at 642) may be substantially similar to the evaluating performed during the hunt mode operations (at 626) described above. Accordingly, in at least some implementations, each individual FOV of the acceptable grid cell may be evaluated and designated as having acceptable quality or unacceptable quality during the performance of the detailed scanning and evaluating (at 642). Similarly, the detailed scanning and evaluating (at 642) may also include counting a number of features that are present or detectable within the field of view (e.g. RBCs, WBCs, MPs, etc.) using known techniques and technologies.

Figure 9:
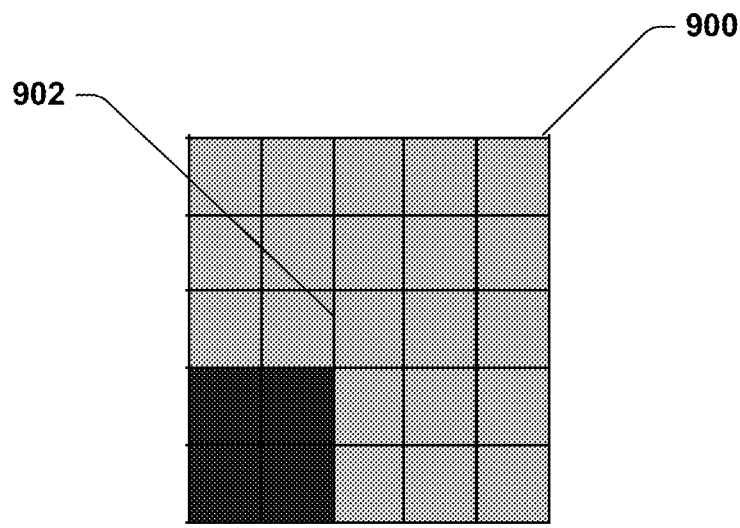
FIG. 9 shows an enlarged view of an acceptable grid cell having a total of twenty five fields of view in accordance with the present disclosure.

For example, FIG. 9 shows an enlarged view of an acceptable grid cell 900 sectioned into a total of twenty five fields of view (i.e. 5 FOVs×5 FOVs). In this implementation, the center FOV 902 was previously scanned and evaluated and determined to be acceptable during the hunt mode operations (at 620). Therefore, upon entering the scan mode operations (at 640), all of the remaining fields of view of the acceptable grid cell 900 are scanned and evaluated (at 642). In the implementation shown in FIG. 9, the FOVs designated as being of acceptable quality are visibly depicted in relatively lighter shading (i.e. 21 acceptable FOVs), while the FOVs designated as being of unacceptable quality are shown in relatively darker shading (i.e. 4 unacceptable FOVs).

As further shown in FIG. 6, the performing scan mode operations (at 640) further includes determining whether the acceptable grid cell remains acceptable at 644 based on the detailed scanning and evaluating of all fields of view (at 642). In at least some implementations, the determining whether the acceptable grid cell remains acceptable (at 644) involves comparing the number of acceptable FOVs to the number of unacceptable FOVs. For example, in some implementations, the acceptable grid cell 900 may be determined to remain acceptable (at 644) when the number of acceptable FOVs is greater than the number of unacceptable FOVs. Alternately, in some implementations, the acceptable grid cell 900 may be determined to remain acceptable (at 644) when the number of acceptable FOVs reaches a suitable threshold, such as a predetermined percentage of the total number of FOVs in the grid cell (e.g. 55%, 60%, 65%, etc.). For example, in the particular implementation shown in FIG. 9, the grid cell 900 may be determined to remain acceptable (at 644) when the number of acceptable FOVs reaches or exceeds 15 FOVs of the total of 25 FOVs in the grid cell 900 (i.e. 60%). Under this criterion, since the acceptable grid cell 900 shown in FIG. 9 includes 21 acceptable FOVs, the acceptable grid cell 900 would be determined to remain acceptable (at 644).

If it is determined (at 644) that the grid cell does not remain acceptable based on the scanning and evaluating of all FOVs of the grid cell (at 642), then the scanning and analyzing process 600 returns to the hunt mode operations (at 620). More specifically, if it is determined that the grid cell does not remain acceptable (at 644), the process 600 returns to determining whether the hunt mode operations have reached the last available grid cell of the coarse grid cells used for hunt mode operations (at 630). The scanning and analyzing process 600 then proceeds from the determination (at 630) as described above, and may perform additional hunt mode operations (at 620) until another acceptable grid cell is located (at 628), at which time the process 600 may return to the scan mode operations (at 640).

Figure 10:
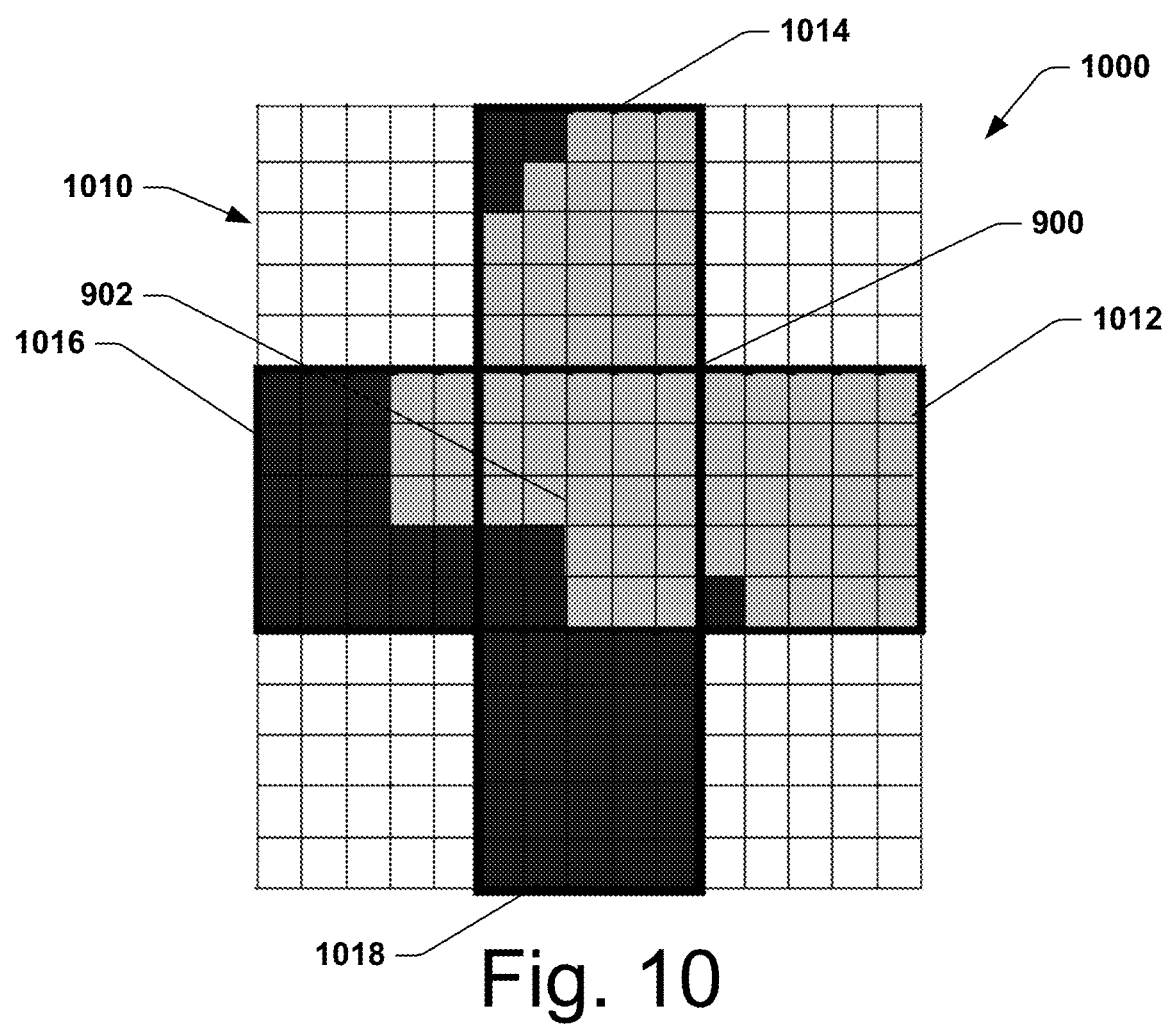
FIG. 10 shows an enlarged view of the acceptable grid cell and a surrounding perimeter of adjacent grid cells in accordance with the present disclosure.

In the embodiment shown in FIG. 6, after the grid cell is determined to be acceptable (at 644), the scan mode operations (at 640) further include performing detailed scanning and evaluating of one or more grid cells adjacent to the acceptable grid cell at 646. More specifically, FIG. 10 shows an enlarged view 1000 of the acceptable grid cell 900 and a surrounding perimeter of adjacent grid cells 1010. It will be appreciated that, in the implementation shown in FIG. 10, there are eight adjacent grid cells in the surrounding perimeter of adjacent grid cells 1010, and that four of the adjacent grid cells (i.e. half) have been scanned and evaluated at 644. In at least some implementations, the detailed scanning and evaluating of one or more grid cells adjacent to the acceptable grid cell (at 646) may include scanning and evaluating the one or more adjacent grid cells that share a common side (or common boundary) with the acceptable grid cell 900 (see FIG. 10), however, in at least some alternate implementations, any other set or subset of the perimeter of adjacent grid cells (e.g. the four adjacent corner grid cells that are adjacent to the four corners of the acceptable grid cell 900) may be selected for scanning and evaluating (at 646). For example, although the embodiment shown in FIG. 10 depicts half of the grid cells adjacent to the acceptable grid cell being scanned and evaluated (at 646), in alternate embodiments, the scanning and evaluating (at 646) may be performed on any suitable number or percentage of grid cells adjacent to the acceptable grid cell (e.g. 25%, 50%, 75%, etc.).

Again, in at least some implementations, the detailed scanning and evaluating of the one or more adjacent grid cells (at 646) may be substantially similar to the scanning and evaluating performed during the hunt mode operations (at 624, 626) described above, and may include designating the quality of each FOV (e.g. acceptable or unacceptable), and may also include counting one or more features present within each FOV (e.g. RBCs, WBCs, MPs, etc.), or determining one or more other characteristics using known techniques and technologies. For example, in the particular example shown in FIG. 10, a first adjacent grid cell 1012 includes 24 acceptable FOVs and 1 unacceptable FOV, a second adjacent grid cell 1014 includes 22 acceptable FOVs and 3 unacceptable FOVs, a third adjacent grid cell 1016 includes 6 acceptable FOVs and 19 unacceptable FOVs, and a fourth adjacent grid cell 1018 includes 25 unacceptable FOVs.

With continued reference to FIG. 6, following the detailed scanning and evaluating of one or more grid cells adjacent to the acceptable grid cell (at 646), the scan mode operations (at 640) proceed to determining at 648 whether one or more criteria have been met for ending the scanning and evaluating process 600. In at least some implementations, a criterion for ending the scanning and evaluating process 600 may be established based on a total number of features that have been counted during the evaluating operations. More specifically, a criterion may be established for ending the process 600 based on a total number of acceptable FOVs having been scanned and evaluated (e.g. terminate if acceptable FOVs>60, terminate if acceptable FOVs>four full grid cells of FOVs, terminate if acceptable FOVs>three full grid cells of FOVs, etc.), a number of white blood cells counted (e.g. terminate if WBCs>1500, 1000, 2500, etc.), a number of red blood cells counted, a number of parasites counted, an amount of time that has elapsed during performance of the scanning and evaluating process 600 (e.g. terminate if time >15 min, 10 min, 20 min, etc.), or any other desired criterion. In at least some implementations, the thick film scanning results (e.g. FIG. 8) may typically provide detailed information regarding number of white blood cells (WBCs) and number of malaria parasites (MPs), and therefore, in at least some implementations, the one or more criteria may include one or more of number of WBCs or number of malaria parasites (MPs).

If it is determined (at 648) that one or more criteria have not been met for ending the scanning and evaluating process 600, then the process 600 returns from the scan mode operations (at 640) to the hunt mode operations (at 620), and more specifically, to determining whether the hunt mode operations have reached the last available grid cell of the coarse grid cells used for hunt mode operations (at 630). The scanning and analyzing process 600 then proceeds from the determination (at 630) as described above, and may perform additional hunt mode operations (at 620) until another acceptable grid cell is located (at 628), at which time the process 600 may return to the scan mode operations (at 640). Eventually, the scanning and analyzing process 600 will determine (at 648) that one or more criteria have been met for ending the scanning and evaluating process 600, and the process 600 then proceeds to end or continue to other operations at 650, such as returning to the appropriate operations of the microscopy process 300 shown in FIG. 3.

The preceding description of the scanning and evaluating process 600 shown in FIG. 6 was described with particular reference to the scanning and analyzing operations performed on the thick film 424 (e.g. operations 322 of FIG. 3). In at least some implementations, the scanning and evaluating process 600 shown in FIG. 6 may also be applied to the scanning and analyzing operations performed on the thin film 426 (e.g. operations 328 of FIG. 3). It will be appreciated, however, that in alternate implementations, one or more various details of the scanning and evaluating process 600 may be adjusted or varied when a different biological sample is under analysis, such as the thin film 426.

Figure 11:
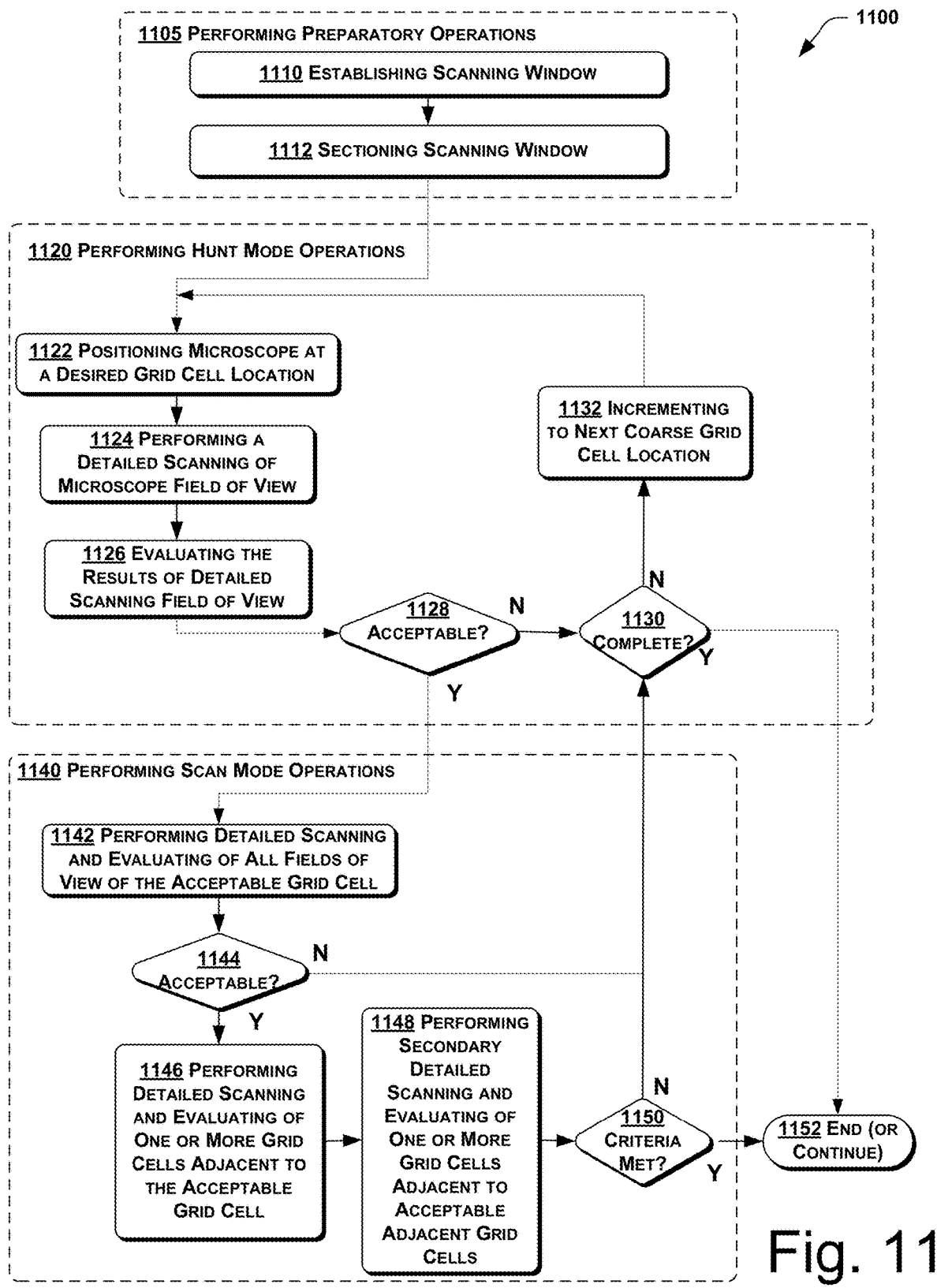
FIG. 11 shows another scanning and evaluating process in accordance with the present disclosure.

For example, FIG. 11 shows another scanning and evaluating process 1100 in accordance with the present disclosure. At least some of the operations of the scanning and evaluating process 1100 (FIG. 11) are substantially similar to the operations of the above-described scanning and evaluating process 600 described above (FIG. 6). Accordingly, the following description of the scanning and evaluating process 1100 will be described with emphasis on one or more particular operations that may desirably be adjusted for scanning and analysis of the thin film 426 (or other biological sample).

In the implementation shown in FIG. 11, the scanning and analyzing process 1100 includes performing preparatory operations at 1105, which may include establishing a scanning window for scanning the thin film 426 (or other biological sample) at 1110. The establishing of the scanning window (at 1110) may include determining a portion of the thin film 426 that may be subject to detailed scanning operations to provide relatively high quality field of view (FOV) images to enable the desired microscopy analysis to be performed.

Figure 12:
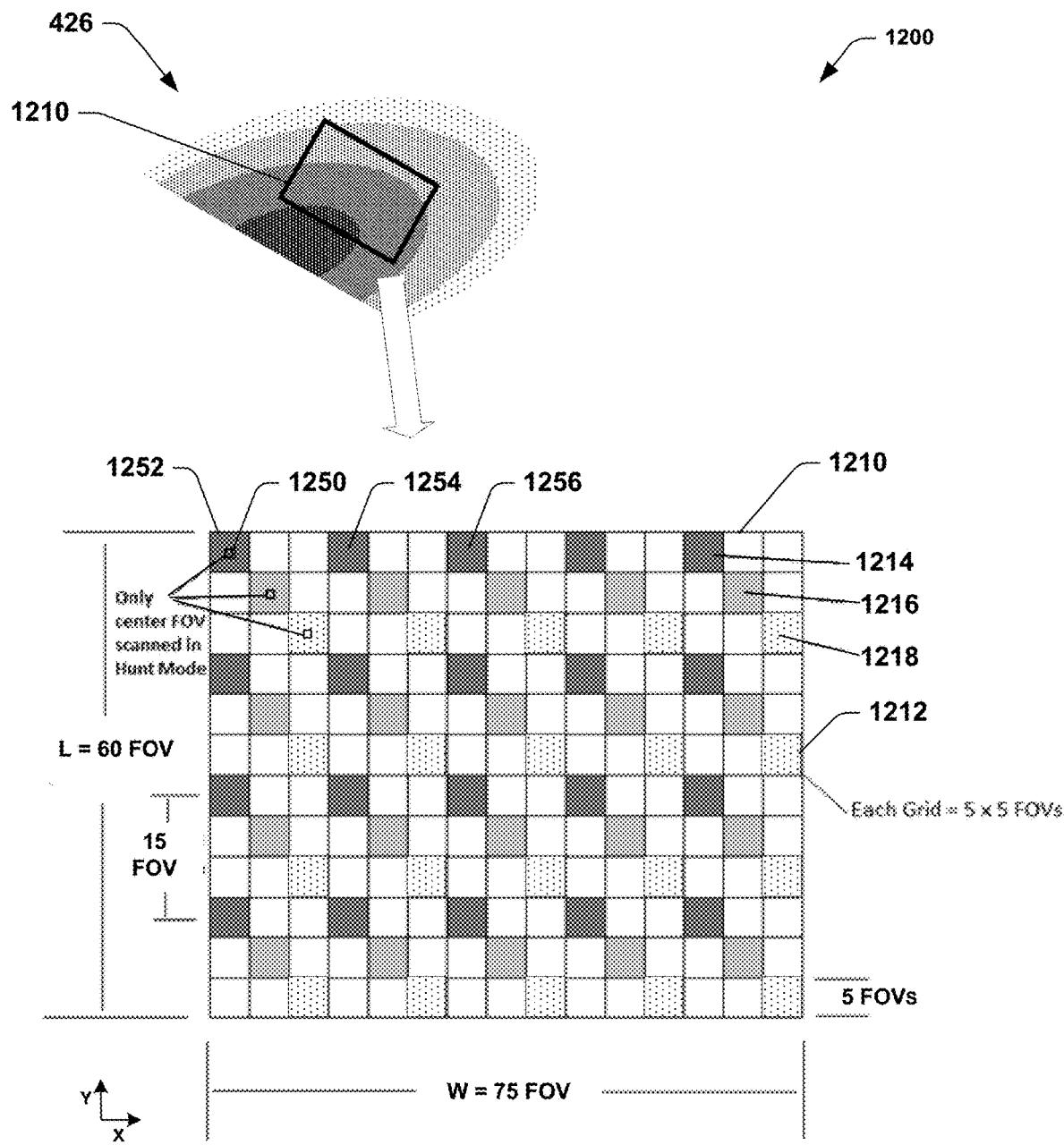
FIG. 12 shows a schematic representation of a scanning window positioned over a thin film in accordance with the present disclosure.

FIG. 12 shows a schematic representation 1200 of a scanning window 1210 having a rectangular shape established on the thin film 426 (at 1110). In this particular embodiment, the scanning window 1210 has a width W of 75 fields of view (e.g. 18.75 mm) and a length L of 60 fields of view (e.g. 15 mm). It will be appreciated that, in alternate embodiments, the scanning window 1210 may have other suitable dimensions, or may be dynamically determined based upon one or more results from the analysis of the macro image 400 of the thin film 426.

The scanning and analyzing process 1100 may further include sectioning the scanning window at 1112. In the embodiment shown in FIG. 12, the scanning window 1210 has been sectioned into a plurality of grid cells 1212, wherein each grid cell 1212 is a square having dimensions 5 FOVs by 5 FOVs, for a total of 25 FOVs per grid 1212. Therefore, in the embodiment shown in FIG. 12, the scanning window 1210 is sectioned into fifteen grid cells wide and twelve grid cells in length for a total of one hundred eighty grid cells 1212. Of course, in alternate embodiments, a wide variety of suitable sectioning arrangements may be conceived in accordance with the scope and teachings of the present disclosure.

In at least some implementations, the sectioning of the scanning window (at 1112) further includes grouping at least some of the grid cells 1212 into a plurality of groups to facilitate subsequent scanning operations. For example, in the embodiment shown in FIG. 12, some of the grid cells (e.g. 20 grid cells) are assigned to a first grid group 1214 (designated by a darkest shading), while other grid cells (e.g. 20 grid cells) are assigned to a second grid group 1216 (designated by an intermediate shading), and still other grid cells (e.g. 20 grid cells) are assigned to a third grid group 1218 (designated by a lightest shading). In at least some implementations, the grid cells of the three grid groups 1214, 1216, 1218 may be relatively uniformly distributed throughout the scanning window 1210, and that the grid cells of each group may be spaced apart from other grid cells of the same group, as shown in FIG. 12. More specifically, in the particular embodiment shown in FIG. 12, the centerpoints (or center FOVs) of the grid cells of the first grid group 1214 are spaced apart by three grid cells (15 FOVs) from the centerpoints of other members of the first grid group 1214. Similarly, the centerpoints (or center FOVs) of the grid cells of the second grid group 1216 are spaced apart by at least three grid cells (15 FOVs) from the centerpoints of other members of the second grid group 1216, and the centerpoints (or center FOVs) of the grid cells of the third grid group 1218 are spaced apart by at least three grid cells (15 FOVs) from the centerpoints of other members of the third grid group 1216. It will be appreciated from the embodiment shown in FIG. 12 that some of the grid cells may not be included in the grouping of the grid cells (at 1112), and such grid cells remain unshaded in FIG. 12. While such ungrouped grid cells may not be used as a coarse grid cell for hunt mode operations, they may be scanned during scan mode operations after a suitable grid cell is located during hunt mode operations, as described more fully below.

It will be appreciated that in alternate implementations, the grid cells 1212 may be grouped into various numbers of groups. For example, in an alternate implementation, the grid cells 1212 may be grouped into two groups (instead of three groups as shown in FIG. 12), and may be distributed similarly to the distribution shown in FIG. 12, in which case the centerpoints (or center FOVs) of the grid cells of the first grid group would be spaced apart by only two grid cells (instead of three grid cells). Generally speaking, in still further implementations, the grid cells may be grouped into a plurality of N groups (e.g. 4 groups, 5 groups, etc.), and may be distributed similarly to the distribution shown in FIG. 12 such that the centerpoints (or center FOVs) of the grid cells of any particular group are spaced apart by N grid cells from the centerpoints of the nearest grid cell(s) of the same group (e.g. along x direction and/or along y direction).

In addition, in the embodiment shown in FIG. 12, the grid cells of the first, second, and third grid groups 1214, 1216, 1218 are aligned diagonally so that the grid cells of a particular group are only adjacent to grid cells of one or more other groups at their respective corners. More specifically, the centerpoint (or center FOV) of a grid cell of the second grid group 1216 is offset diagonally (e.g. down one grid cell in the −y direction and offset over one grid cell in the x direction) from the centerpoint of a grid cell in the first grid group 1214. Similarly, the centerpoint (or center FOV) of a grid cell of the third grid group 1218 is offset diagonally (e.g. down one grid cell in the −y direction and offset over one grid cell in the x direction) from the centerpoint of a grid cell in the second grid group 1216. In further implementations, the grid cells of the different grid groups may be re-oriented such that they are aligned diagonally along one or more of the other possible diagonal directions (i.e. offset x and y directions, offset −x and y directions, or offset −x and −y directions). Of course, in alternate implementations, a wide variety of suitable sectioning arrangements may be conceived in accordance with the scope and teachings of the present disclosure.

With continued reference to FIG. 11, the scanning and analyzing process 1100 further includes performing hunt mode operations at 1120. In at least some implementations, the performing hunt mode operations (at 1120) includes positioning the microscope at a desired grid location at 1122. For example, as shown in FIG. 12, the microscope 112 may initially be positioned so that the field of view of the objective lens 212 is at a center FOV 1250 of a first grid cell 1252 of the scanning window 1210. As noted above, in at least some implementations, the positioning of the microscope (at 1122) may also include one or more focusing or re-focusing operations (e.g. using position controller 216, positioner 214, etc. of the microscope assembly 110).

Figure 13:
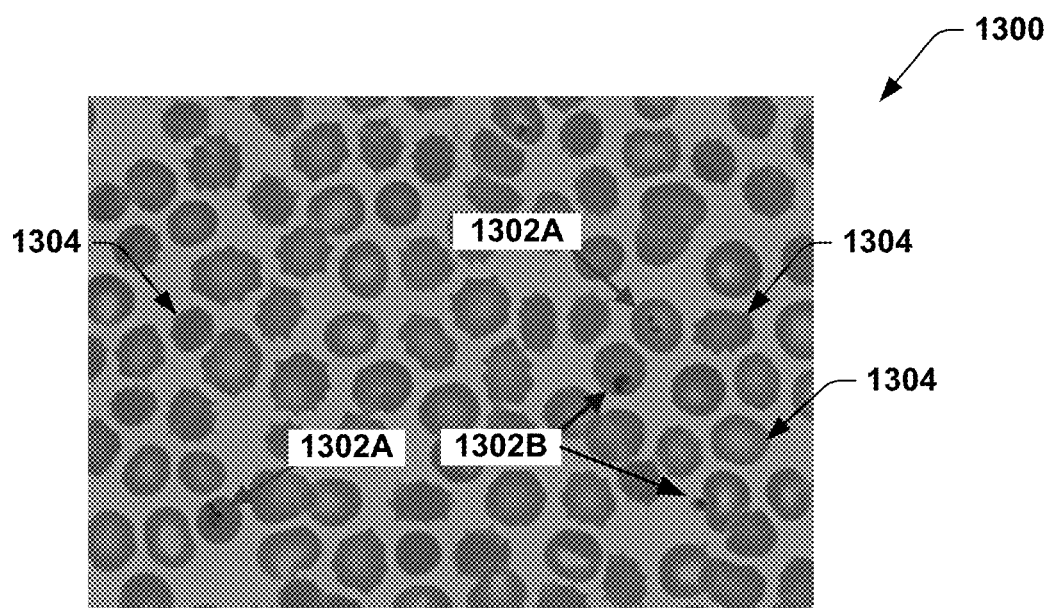
FIG. 13 shows representative scanning results of the type obtained during a detailed scanning of the thin film.

In the embodiment shown in FIG. 11, the scanning and analyzing process 1100 further includes performing a detailed scanning of the microscope field of view within the thin film at 1124. For example, FIG. 13 shows a representative scanning results 1300 of the type that may be obtained during the detailed scanning of the thin film (at 1124). In this example, the representative scanning results 1300 include a plurality of malaria parasites 1302 (indicated by dark specks), and a plurality of red blood cells 1304 (indicated by circles and stippled circles). In addition, in at least some implementations, the representative scanning results 1300 of the thin film 426 may discriminate between malaria parasites of a first species 1302A and malaria parasites of a second species 1302B.

The scanning and analyzing process 1100 further includes evaluating the results of the detailed scanning of the field of view within the thin film at 1126. In at least some implementations, the evaluating of the results of the detailed scanning may include determining one or more of composition (i.e. is the FOV empty?), exposure, focus, number of red blood cells, separation of red blood cells, bubbles, large stain deposits, dirt on the slide, clarity, sharpness, blurriness, brightness, or any other suitable quality characteristics, and providing a quality assessment of the scanning results associated with the field of view. In at least some implementations, the evaluating of the results of the detailed scanning (at 1126) may include using known automated image-recognition techniques and technologies, as described more fully above. As further shown in FIG. 11, the scanning and analyzing process 1100 may next determine whether the results of the detailed scanning are acceptable at 1128. If not, then the scanning and analyzing process 1100 determines whether the hunt mode operations are complete based on one or more criteria at 1130 (e.g. total time in hunt mode, max number of coarse grid points scanned, etc.). If hunt mode operations are complete (at 1130), then the process 1100 proceeds to end or continue to other operations at 1152 (e.g. returning to appropriate operations of the microscopy process 300 of FIG. 3). Alternately, if hunt mode operations are not complete (at 1130), then the scanning and analyzing process 1100 includes incrementing to a next coarse grid cell location at 1132, and the above-described hunt mode operations (at 1120-1128) are then repeated for the new coarse grid cell location.

More specifically, for the implementation shown in FIG. 12, in at least some implementations, the hunt mode operations may begin scanning at the center FOV 1252 (or other desired grid cell location) of the first coarse grid cell 1250, and may incrementally perform the hunt mode operations (at 1120-1128) across the members of the first grid group 1214 (e.g. to center FOV 1254, then to center FOV 1256, etc.), then across the members of the second grid group 1216, and then across the members of the third grid group 1218, until the hunt mode operations are determined to be complete (at 1130).

Referring again to FIG. 11, once it is determined that the results of the detailed scanning of the center FOV of the coarse grid cell are acceptable (at 1128), then the scanning and analyzing process 1100 proceeds from the hunt mode operations (at 1120) to performing "scan mode" operations at 1140. More specifically, the scan mode operations (at 1140) include performing detailed scanning and evaluating of all fields of view within the acceptable grid cell at 1142. Accordingly, the detailed scanning and evaluating (at 1142) may also include counting a number of features that are present or detectable within the field of view (e.g. RBCs, WBCs, MPs, etc.) using known techniques and technologies. In at least some implementations, the thin film scanning results (e.g. FIG. 13) may typically provide detailed information regarding number of red blood cells (RBCs) and number of malaria parasites (MPs), including different species of malaria parasites (e.g. 1302A, 1302B).

Similarly, each individual FOV of the acceptable grid cell may be evaluated and designated as having acceptable quality or unacceptable quality during the performance of the detailed scanning and evaluating (at 1142). For example, as previously described with reference to FIG. 9, a grid cell that was deemed acceptable during the hunt mode operations at 1140 has all of the remaining fields of view of the acceptable grid cell scanned and evaluated (at 1142), and all of the individual FOVs of the grid cell are designated as being of acceptable quality (i.e. 21 acceptable FOVs), or of unacceptable quality (i.e. 4 unacceptable FOVs).

The scan mode operations (at 1140) further include determining whether the acceptable grid cell remains acceptable at 1144 based on the detailed scanning and evaluating of all fields of view (at 1142). Possible criteria for determining whether the grid cell remains an acceptable grid cell (at 1144) were described more fully above (with respect to operation 642 of FIG. 6). If the grid cell is determined to not be acceptable (at 1142), then the scanning and analyzing process 1100 returns to the hunt mode operations (at 1120), or more specifically, to determining whether the hunt mode operations are complete (at 1130).

Figure 14:
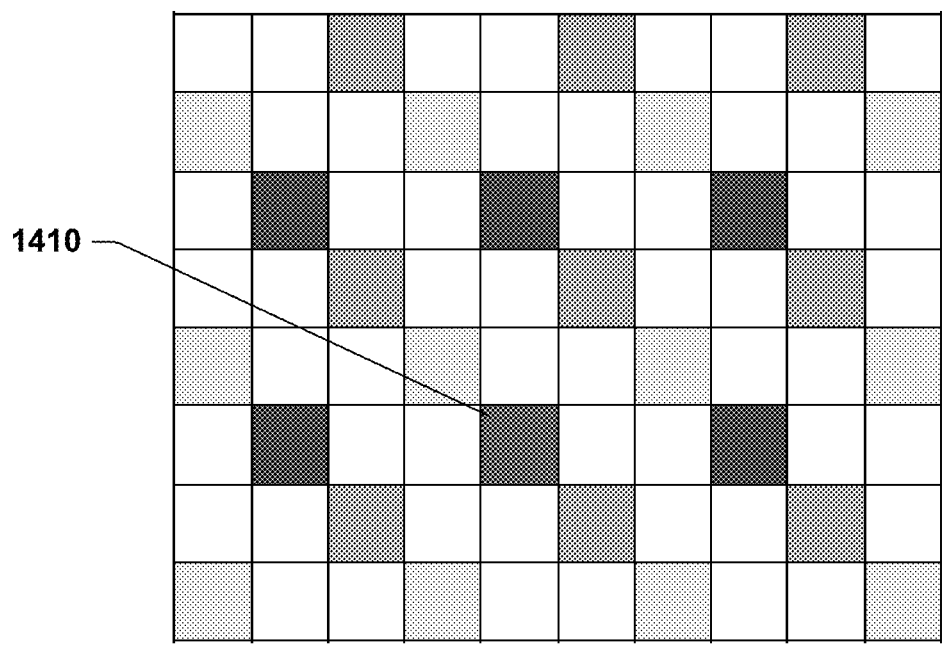
FIG. 14 shows an implementation of a scanning window sectioned into grid cells and including a grid cell determined to be acceptable during scan mode operations.

Alternately, if the grid cell is determined to be acceptable (at 1144), then the scan mode operations (at 1140) proceed to performing detailed scanning and evaluating of one or more grid cells adjacent to the acceptable grid cell at 1146. For example, FIG. 14 shows an implementation of a scanning window 1400 sectioned into grid cells and including a grid cell 1410 determined to be acceptable during scan mode operations (at 1142). In this implementation, the scanning window 1400 is 10 grid cells by 8 grid cells, and includes three groups of grid cells (indicated by light, medium, and dark shading) distributed in a diagonal pattern.

Figure 15:
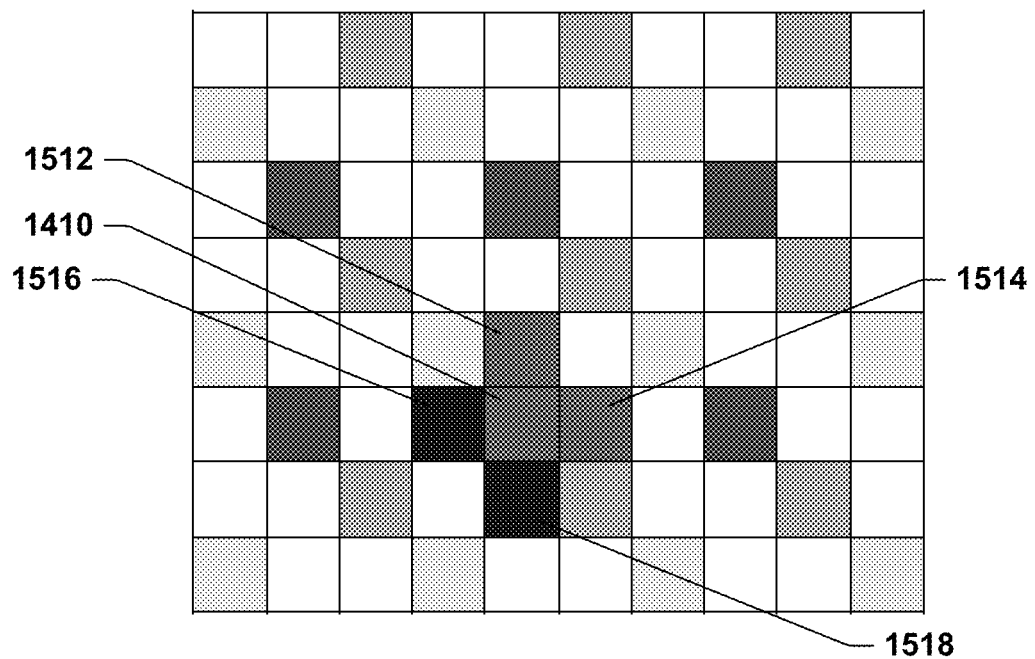
FIGS. 15 and 16 show the scanning window of FIG. 14 after additional scan mode operations.

The detailed scanning and evaluating of one or more grid cells adjacent to the acceptable grid cell (at 1146) may be performed in a variety of suitable ways. In at least some implementations, the detailed scanning and evaluating (at 1146) may be performed on four of the eight grid cells adjacent to the acceptable grid cell 1410 (e.g. as described above with reference to FIG. 10). For example, FIG. 15 shows exemplary results of the detailed scanning and evaluating of four grid cells adjacent to the acceptable grid cell (at 1146). In this representative example, first and second adjacent grid cells 1512, 1514 are determined to be acceptable (as indicated by dark shading), while third and fourth adjacent grid cells 1516, 1518 are determined to be unacceptable (as indicated by darkest shading). In alternate implementations, different configurations of adjacent grid cells may be scanned and evaluated (at 1146), including the scanning and evaluating of more, less, or different adjacent grid cells.

With continued reference to FIG. 11, the scan mode operations (at 1140) of the process 1100 further include performing secondary detailed scanning and evaluating of one or more grid cells adjacent to acceptable adjacent grid cells at 1148. More specifically, as described above and shown in FIG. 10, the first and second adjacent grid cells 1512, 1514 were determined to be acceptable during the scanning and evaluating of one or more grid cells adjacent to the acceptable grid cell (at 1146). Therefore, at 1148, the secondary scanning and evaluating operations are performed on one or more grid cells adjacent to the first adjacent grid cell 1512, and also secondary scanning and evaluating operations are performed on one or more grid cells adjacent to the second adjacent grid 1514.

Figure 16:
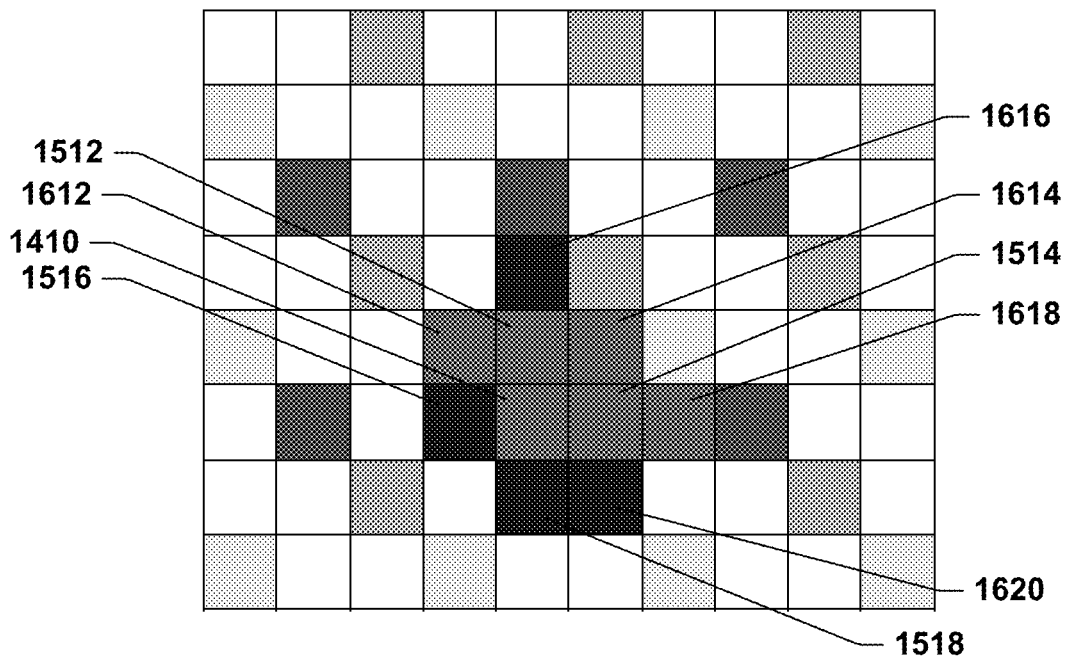

For example, FIG. 16 shows exemplary results of the secondary detailed scanning and evaluating of four grid cells adjacent to the acceptable grid cell (at 1148). In this representative example, of the three grid cells adjacent to the first adjacent grid cell 1512 scanned (at 1148), the first and second secondary adjacent grid cells 1612, 1614 are determined to be acceptable (as indicated by dark shading), while the third secondary adjacent grid cell 1616 is determined to be unacceptable (as indicated by darkest shading). Furthermore, of the two grid cells adjacent to the second adjacent grid cell 1514 scanned (at 1148), the fourth secondary adjacent grid cell 1618 is determined to be acceptable (as indicated by dark shading), while the fifth secondary adjacent grid cell 1620 is determined to be unacceptable (as indicated by darkest shading). Again, in alternate implementations, different configurations of secondary adjacent grid cells may be scanned and evaluated (at 1148), including the scanning and evaluating of more, less, or different secondary adjacent grid cells.

Referring again to FIG. 11, following the secondary detailed scanning and evaluating of one or more grid cells adjacent to the acceptable grid cell (at 1148), the scan mode operations (at 1140) proceed to determining at 1150 whether one or more criteria have been met for ending the scanning and evaluating process 1100. As noted above with respect to the process 600, in at least some implementations, a criterion for ending the scanning and evaluating process 1100 may be established based on a variety of different aspects, including a total number of acceptable fields of view obtained during the scanning and evaluating operations (e.g. acceptable FOVs greater than 60, greater than four full grid cells of FOVs, greater than three full grid cells of FOVs, etc.), a number of white blood cells counted (e.g. terminate if WBCs>1500, 1000, 2500, etc.), a number of red blood cells counted counted (e.g. terminate if RBCs>20,000, 15,000, 25,000, etc.), a number of parasites or individual species of parasites counted, an amount of time that has elapsed (e.g. terminate if time >15 min, 10 min, 20 min, etc.), or any other desired criterion. In at least some implementations, the thin film scanning results (e.g. FIG. 13) may typically provide detailed information regarding number of red blood cells (RBCs) and number of malaria parasites (MPs) (including individual species of parasites), and therefore, in at least some implementations, the one or more criteria may include one or more of number of RBCs or number of malaria parasites (MPs).

If it is determined (at 1150) that one or more criteria have not been met for ending the scanning and evaluating process 1100, then the process 1100 returns from the scan mode operations (at 1140) to the hunt mode operations (at 1120), and more specifically, to determining whether the hunt mode operations are determined to be complete (at 1130). The scanning and analyzing process 1100 then proceeds from the determination (at 1130) as described above, and may perform additional hunt mode operations (at 1120) until another acceptable grid cell is located (at 1128), at which time the process 1100 may return to the scan mode operations (at 1140). Eventually, the scanning and analyzing process 1100 may determine (at 1150) that one or more criteria have been met for ending the scanning and evaluating process 1100, and the process 1100 then proceeds to end or continue to other operations at 1152, such as returning to the appropriate operations of the microscopy process 300 shown in FIG. 3.

Based on the foregoing description, it will be appreciated that techniques and technologies for automated microscopy analysis of biological samples in accordance with the present disclosure may provide considerable advantages over conventional techniques and technologies. More specifically, in at least some implementations, systems in accordance with the present disclosure may autonomously identify regions of microscope slides containing a biological sample (e.g. blood), may identify various regions and subregions of the sample that are suitable for microscopic analysis, and may provide an automated scanning strategy to ensure that enough high quality regions of the sample are effectively and efficiently scanned to provide a proper analysis of the sample. In at least some implementations, such systems may use a machine learning method (e.g. deep learning or other region detection methods) to identify thick and thin film regions of a slide based on an initial low-magnification (or macro) image of the slide.

In at least some implementations, systems in accordance with the present disclosure may capture high magnification scans at various fields of view within the region, and may follow a scanning strategy that takes into account an evaluation of each FOV's suitability for analysis. Based on the suitability evaluation, a location of the next high-quality scan to capture within the sample (thick or thin film) is determined. Such systems may continue automatically capturing and analyzing detailed, high-magnification scans until a predefined criteria is satisfied (e.g. a criteria that specifies a total number of acceptable FOVs, a total number of white blood cells or red blood cells captured for analysis, etc.).

Techniques and technologies in accordance with the present disclosure may advantageously decrease scanning times by reducing the number of low-quality fields of view scanned, by reducing the time and effort required by the operator to select an appropriate region of the slide, and by reducing the amount of time needed to reject a poor-quality slide. Such techniques and technologies may be particularly valuable for the batch-imaging of many slides, or for performing time-sensitive analyses of biological samples.

Although the techniques and technologies for automated microscopy processes have been described above with reference to the particular microscopy process 300 shown in FIG. 3, it will be appreciated that such techniques and technologies may also be suitably implemented in a wide variety of other microscopy processes. For example, in at least some implementations, the scanning and analysis of the thick film may be performed at least partially simultaneously with the scanning and analysis of the thin film. In such implementations, if the scanning and analysis of one of the portions of the biological sample are completed and negative results are obtained (e.g. no malaria parasites, insufficient number of acceptable FOVs, insufficient number of WBCs or RBCs, etc.), then the scanning and analysis of the other portion of the biological sample may be terminated, thereby saving time or resources. In another example, in some implementations, the results of the analysis of one portion of the slide (e.g. the thick film) may influence the criteria required to end scanning of another portion of the slide (e.g. the thin film). As one specific example, if the results of the thick film are negative for malaria parasites, the criteria of the number of acceptable fields of view or detected RBCs needed from the thin film will be lower than if the results of the thick film were positive for malaria.

Figure 17:
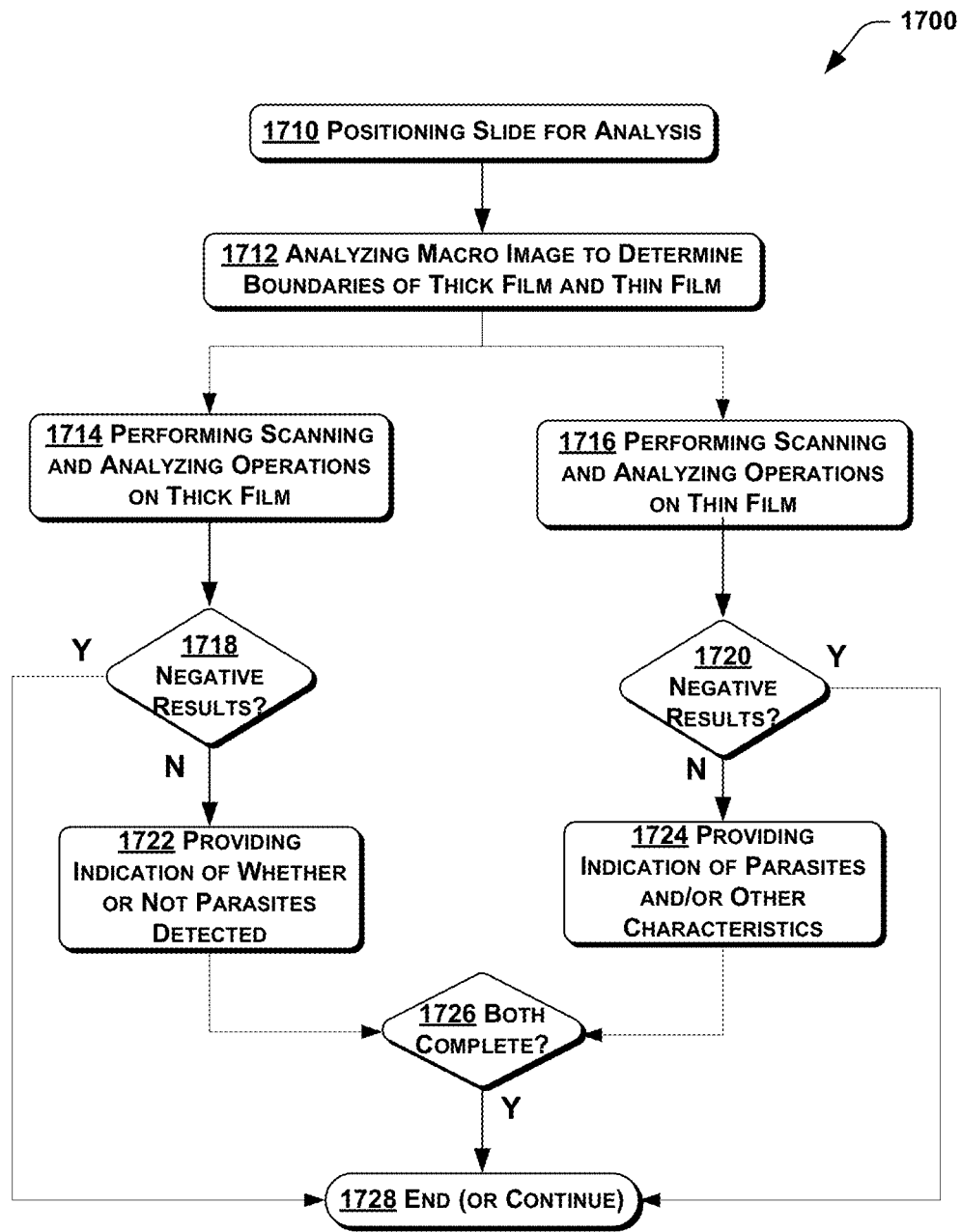
FIG. 17 shows another embodiment of a microscopy process in accordance with the present disclosure.

For example, FIG. 17 shows another embodiment of a microscopy process 1700 in accordance with the present disclosure. In this embodiment, the microscopy process 1700 includes positioning a slide for analysis at 1710, such as by placing the slide 120 onto the motorized stage 210 of the automated microscope assembly 110, and operating the motorized stage 210 to position the slide 120 in a proper position relative to the microscope 112. The process 300 further includes analyzing the macro image of the slide to determine the boundaries of the thick film and the thin film at 1712. Techniques for automatic detection of biological sample boundaries on a microscopic slide (e.g. thick film 424, thin film 426) using automated microscope assemblies are generally known as described above.

Next, the process 1700 includes performing scanning and analyzing operations on the thick film at 1714, and at least partially simultaneously performing scanning and analyzing operations on the thin film at 1716. It will be appreciated that, in at least some implementations, the scanning and analyzing operations on the thick film (at 1714) may be completed before the scanning and analyzing operations on the thin film (at 1716). Of course, in alternate implementations, the thin film operations (at 1716) may be completed before the thick film operations (at 1714).

As further shown in FIG. 17, the microscopy process 1700 further includes determining whether the results of the thick film operations are negative (or otherwise unacceptable) at 1718 and determining whether the results of the thin film operations are negative (or otherwise unacceptable) at 1720. If it is determined (at 1718) that the results of the thick film operations are negative (at 1718), or if it is determined that the results of the thin film operations are negative (at 1720), then the microscopy process 1700 proceeds to end or continue to other operations at 1728.

Alternately, if the results of the thick film operations are not negative (at 1718) then the process 1700 includes providing an indication of whether or not parasites are detected at 1722. Similarly, if the results of the thin film operations are not negative (at 1720) then the process 1700 includes providing an indication of parasites and/or other characteristics of the sample at 1724. Next, once both the thick film operations and the thin film operations are determined to be complete at 1726, then the microscopy process 1700 ends or continues to other operations at 1728.

Figure 18:
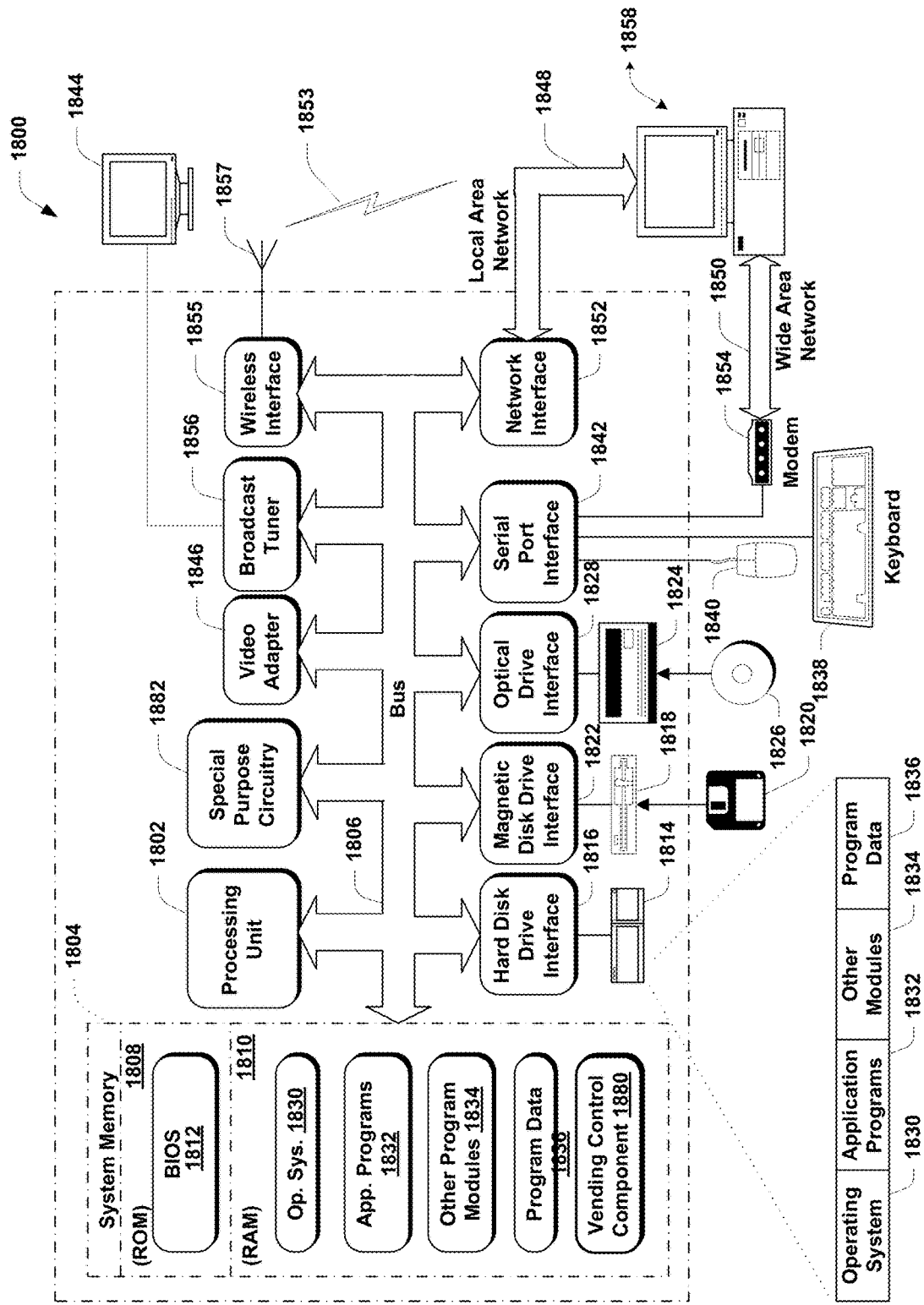
FIG. 18 shows a schematic representation of a computing system for implementing one or more aspects of the present disclosure.

In some implementations, one or more aspects of the above-described microscopy processes may be at least partially implemented using a computing device (e.g. the computing device 140, the master controller 202, etc.). For example, FIG. 18 is a schematic view of an exemplary computing device 1800 configured to operate in accordance with an implementation of the present disclosure. As described below, the computing device 1800 can be configured to perform one or more of the functions and operations associated with one or more of the techniques and technologies for automated microscopy processes disclosed herein.

As shown in FIG. 18, in some implementations, the computing device 1800 may include one or more processors (or processing units) 1802, special purpose circuitry 1882, a memory 1804, and a bus 1806 that couples various system components, including the memory 1804, to the one or more processors 1802 and special purpose circuitry 1882. The bus 1806 represents one or more of any of several types of bus structures, including a memory bus or memory controller, a peripheral bus, an accelerated graphics port, and a processor or local bus using any of a variety of bus architectures. In this implementation, the memory 1804 includes read only memory (ROM) 1808 and random access memory (RAM) 1810. A basic input/output system (BIOS) 1812, containing the basic routines that help to transfer information between elements within the computing device 1800, such as during start-up, is stored in ROM 1808.

The exemplary computing device 1800 further includes a hard disk drive 1814 for reading from and writing to a hard disk (not shown), and is connected to the bus 1806 via a hard disk drive interface 1816 (e.g., a SCSI, ATA, or other type of interface). A magnetic disk drive 1818 for reading from and writing to a removable magnetic disk 1820, is connected to the system bus 1806 via a magnetic disk drive interface 1822. Similarly, an optical disk drive 1824 for reading from or writing to a removable optical disk 1826 such as a CD ROM, DVD, or other optical media, connected to the bus 1806 via an optical drive interface 1828. The drives and their associated computer-readable media provide nonvolatile storage of computer readable instructions, data structures, program modules and other data for the computing device 1800. Although the exemplary computing device 1800 described herein employs a hard disk, a removable magnetic disk 1820 and a removable optical disk 1826, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

As further shown in FIG. 18, a number of program modules may be stored on the memory 1804 (e.g. the ROM 1808 or the RAM 1810) including an operating system 1830, one or more application programs 1832, other program modules 1834, and program data 1836. Alternately, these program modules may be stored on other computer-readable media, including the hard disk, the magnetic disk 1820, or the optical disk 1826. For purposes of illustration, programs and other executable program components, such as the operating system 1830, are illustrated in FIG. 18 as discrete blocks, although it is recognized that such programs and components reside at various times in different storage components of the computing device 1800, and may be executed by the processor(s) 1802 or the special purpose circuitry 1882 of the computing device 1800.

A user may enter commands and information into the computing device 1800 through input devices such as a keyboard 1838 and a pointing device 1840. Other input devices (not shown) may include a microphone, joystick, game pad, satellite dish, scanner, or the like. These and other input devices are connected to the processing unit 1802 and special purpose circuitry 1882 through an interface 1842 that is coupled to the system bus 1806. A monitor 1844 or other type of display device is also connected to the bus 1806 via an interface, such as a video adapter 1846. In addition to the monitor, the computing device 1800 may also include other peripheral output devices (not shown) such as speakers and printers.

The computing device 1800 may operate in a networked environment using logical connections to one or more remote computers (or servers) 1858. Such remote computers (or servers) 1858 may be a personal computer, a server, a router, a network PC, a peer device or other common network node, (or the automated microscopy assembly 110 of FIG. 1) and may include many or all of the elements described above relative to computing device 1800. The logical connections depicted in FIG. 18 may include one or more of a local area network (LAN) 1848 and a wide area network (WAN) 1850. Such networking environments are commonplace in offices, enterprise-wide computer networks, intranets, and the Internet. In this embodiment, the computing device 1800 also includes one or more broadcast tuners 1856. The broadcast tuner 1856 may receive broadcast signals directly (e.g., analog or digital cable transmissions fed directly into the tuner 1856) or via a reception device (e.g., via an antenna, a satellite dish, etc.).

When used in a LAN networking environment, the computing device 1800 may be connected to the local network 1848 through a network interface (or adapter) 1852. When used in a WAN networking environment, the computing device 1800 typically includes a modem 1854 or other means for establishing communications over the wide area network 1850, such as the Internet. The modem 1854, which may be internal or external, may be connected to the bus 1806 via the serial port interface 1842. Similarly, the computing device 1800 may exchange (send or receive) wireless signals 1853 with one or more remote computers (or servers) 1858, (or with the automated microscopy assembly 110 of FIG. 1), using a wireless interface 1855 coupled to a wireless communicator 1857 (e.g., an antenna, a satellite dish, a transmitter, a receiver, a transceiver, a photoreceptor, a photodiode, an emitter, a receptor, etc.).

In a networked environment, program modules depicted relative to the computing device 1800, or portions thereof, may be stored in the memory 1804, or in a remote memory storage device. The program modules may be implemented using software, hardware, firmware, or any suitable combinations thereof. In cooperation with the other components of the computing device 1800, such as the processing unit 1802 or the special purpose circuitry 1882, the program modules may be operable to perform one or more implementations or aspects of processes in accordance with the present disclosure.

Generally, application programs and program modules executed on the computing device 1800 may include routines, programs, objects, components, data structures, etc., for performing particular tasks or implementing particular abstract data types. These program modules and the like may be executed as native code or may be downloaded and executed, such as in a virtual machine or other just-in-time compilation execution environments. Typically, the functionality of the program modules may be combined or distributed as desired in various implementations.

In view of the disclosure of techniques and technologies for automated microscopy systems and methods as disclosed herein, a few representative embodiments are summarized below. It should be appreciated that the representative embodiments described herein are not intended to be exhaustive of all possible embodiments, and that additional embodiments may be readily conceived from the disclosure of techniques and technologies provided herein.

For example, in at least some implementations, a microscopy system includes a microscope assembly configured for obtaining a microscopic scan of a field of view within a sample, the microscope assembly being operable to perform operations including: define a scanning window over at least a portion of the sample into a plurality of grid cells, wherein individual grid cells of the plurality of grid cells are sized to include a plurality of fields of view; define a coarsely-spaced grid pattern that includes a plurality of coarsely-spaced grid cells; perform hunt mode operations including: perform the microscopic scan at a selected field of view within a selected coarsely-spaced grid cell of the plurality of coarsely-spaced grid cells; evaluate a quality of a scan result from the microscopic scan within the selected coarsely-spaced grid cell; if the quality of the scan result at the selected field of view is not acceptable, select a next coarsely-spaced grid cell as the selected coarsely-spaced grid cell and return to perform the microscopic scan and evaluate the quality of the scan result; if the quality of the scan result at the selected field of view is acceptable, then: perform the microscopic scan over all remaining fields of view of the selected coarsely-spaced grid cell; evaluate a quality of the scan results from all remaining fields of view of the selected coarsely-spaced grid cell; assess whether the selected coarsely-spaced grid cell is acceptable based on the quality of the scan results from all fields of view of the selected coarsely-spaced grid cell; if the selected coarsely-spaced grid cell is not acceptable, select a next coarsely-spaced grid cell as the selected coarsely-spaced grid cell and return to perform the microscopic scan and evaluate the quality of the scan results; and if the selected coarsely-spaced grid cell is acceptable, then proceed to scan mode operations; perform scan mode operations including: perform the microscopic scan at all fields of view within one or more adjacent grid cells within a perimeter of grid cells that are adjacent to the selected coarsely-spaced grid cell that is acceptable; evaluate a quality of the scan results from the microscopic scan at all fields of view within the one or more adjacent grid cells; and for each of the one or more adjacent grid cells, if the quality of the scan results is acceptable for the adjacent grid cell, compile one or more aspects of the acceptable scan results with previous acceptable scan results; if one or more criteria for terminating scanning operations have not been met, select a next coarsely-spaced grid cell as the selected coarsely-spaced grid cell and return to perform hunt mode operations; and if the one or more criteria for terminating scanning operations have been met, provide an indication of the compiled one or more aspects of the acceptable scan results.

In at least some implementations, the sample comprises at least one of a thick film or a thin film of a blood sample, and wherein one or more criteria for terminating scanning operations comprises: one or more of a total number of acceptable fields of view scanned, a total number of white blood cells counted, a total number of red blood cells counted, a total number of malaria parasites counted, an amount of time elapsed during hunt mode operations, an amount of time elapsed during scan mode operations, or a total amount of time elapsed. Similarly, in some implementations, define a scanning window over at least a portion of the sample into a plurality of grid cells, wherein individual grid cells of the plurality of grid cells are sized to include a plurality of fields of view comprises: define a scanning window into a plurality of square grid cells, wherein individual square grid cells include an equal number of rows and columns of fields of view. In further implementations, perform the microscopic scan at a selected field of view within a selected coarsely-spaced grid cell of the plurality of coarsely-spaced grid cells comprises: perform the microscopic scan at a center field of view of a selected coarsely-spaced grid cell of the plurality of coarsely-spaced grid cells.

In addition, in at least some implementations, assess whether the selected coarsely-spaced grid cell is acceptable based on the quality of the scan results from all fields of view of the selected coarsely-spaced grid cell comprises: assess that the selected coarsely-spaced grid cell is acceptable when at least a threshold percentage of the fields of view of the selected coarsely-spaced grid cells are evaluated to provide acceptable scan results. Similarly, in further implementations, the threshold percentage is at least fifty percent.

In further implementations, define a coarsely-spaced grid pattern that includes a plurality of coarsely-spaced grid cells comprises: define a coarsely-spaced grid pattern that includes a first coarsely-spaced grid cell located proximate to a center of the scanning window, and a plurality of first non-adjacent grid cells located within a first non-adjacent perimeter disposed about and spaced apart from the first coarsely-spaced grid cell. Similarly, in at least some implementations, select a next coarsely-spaced grid cell as the selected coarsely-spaced grid cell comprises: select a next coarsely-spaced grid cell as the selected coarsely-spaced grid cell, including at least one of: proceed outwardly from the first coarsely-spaced grid cell to select a first non-adjacent grid cell located within the first non-adjacent perimeter; or proceed laterally from one of first non-adjacent grid cells to select another of the first non-adjacent grid cells located within the first non-adjacent perimeter. In further implementations, define a coarsely-spaced grid pattern that includes a plurality of coarsely-spaced grid cells comprises: define a coarsely-spaced grid pattern that includes a plurality of second non-adjacent grid cells located within a second non-adjacent perimeter disposed about and spaced apart from the first non-adjacent perimeter.

Moreover, in at least some implementations, define a coarsely-spaced grid pattern that includes a plurality of coarsely-spaced grid cells comprises: define a coarsely-spaced grid pattern that includes a first group of first non-adjacent grid cells and a second group of second non-adjacent grid cells, the first non-adjacent grid cells of the first group being distributed throughout the scanning window and each first non-adjacent grid being non-adjacent to other first non-adjacent grid cells, and each second non-adjacent grid cell being diagonally-disposed proximate to at least one first non-adjacent grid cell and being non-adjacent to other second non-adjacent grid cells. In still other implementations, select a next coarsely-spaced grid cell as the selected coarsely-spaced grid cell comprises: select a next coarsely-spaced grid cell as the selected coarsely-spaced grid cell, including at least one of: proceed from one of the first non-adjacent grid cells of the first group to another of first non-adjacent grid cells of the first group; proceed from one of the first non-adjacent grid cells of the first group to one of second non-adjacent grid cells of the second group that is diagonally-disposed proximate the one of the first non-adjacent grid cells of the first group; or proceed from one of the second non-adjacent grid cells of the second group to another of second non-adjacent grid cells of the second group. And in other implementations, define a coarsely-spaced grid pattern that includes a plurality of coarsely-spaced grid cells comprises: define a coarsely-spaced grid pattern that includes a third group of third non-adjacent grid cells, each third non-adjacent grid cell being diagonally-disposed proximate to at least one second non-adjacent grid cell and being non-adjacent to other third non-adjacent grid cells.

In at least some other implementations, perform the microscopic scan at all fields of view within one or more adjacent grid cells within a perimeter of grid cells that are adjacent to the selected coarsely-spaced grid cell that is acceptable comprises: perform the microscopic scan at all fields of view within half of the adjacent grid cells within a perimeter of grid cells that are adjacent to the selected coarsely-spaced grid cell that is acceptable. Similarly, in some implementations, perform the microscopic scan at all fields of view within one or more adjacent grid cells within a perimeter of grid cells that are adjacent to the selected coarsely-spaced grid cell that is acceptable comprises: perform the microscopic scan at all fields of view within one or more adjacent grid cells within a perimeter of grid cells that are adjacent to, and that share a common boundary with, the selected coarsely-spaced grid cell that is acceptable. And in still further implementations, perform the microscopic scan at all fields of view within one or more adjacent grid cells within a perimeter of grid cells that are adjacent to the selected coarsely-spaced grid that is acceptable comprises: perform the microscopic scan at all fields of view within one or more adjacent grid cells within a perimeter of grid cells that are adjacent to, and that share a common cornerpoint with, the selected coarsely-spaced grid that is acceptable.

In still further implementations, perform scan mode operations further comprises: for each of the one or more adjacent grid cells, if the quality of the scan results is acceptable for the adjacent grid, then: perform the microscopic scan at all fields of view within one or more secondary adjacent grid cells within a perimeter of grid cells that are adjacent to the acceptable adjacent grid cell; evaluate a quality of the scan results from the microscopic scan at all fields of view within the one or more secondary adjacent grid cells; and for each of the one or more secondary adjacent grid cells, if the quality of the scan results is acceptable for the secondary adjacent grid cell, compile one or more aspects of the acceptable scan results with previous acceptable scan results. Alternately, in still other implementations, evaluate a quality of a scan result from the microscopic scan within the selected coarsely-spaced grid cell comprises: evaluate a quality of a scan result from the microscopic scan within the selected coarsely-spaced grid cell based on one or more of clarity, sharpness, blurriness, or brightness. Similarly, in further implementations, evaluate a quality of a scan result from the microscopic scan within the selected coarsely-spaced grid cell comprises: assign a quality assessment score based on an evaluation of a quality of the scan results.

In additional implementations, the microscope assembly is operable to perform operations comprising: obtain a macro image of at least a portion of the sample; and analyze the macro image to determine a suitability of the at least a portion of the sample for analysis. In some implementations, analyze the macro image to determine a suitability of the at least a portion of the sample for analysis comprises: perform one or more machine learning operations using one or more image recognition models to determine a suitability of the at least a portion of the sample for analysis. In still other implementations, define a scanning window over at least a portion of the sample into a plurality of grid cells comprising: obtain a macro image of at least a portion of the sample; analyze the macro image to determine one or more boundaries of the at least a portion of the sample; and define a location of the scanning window based on the one or more boundaries of the at least a portion of the sample. And yet other implementations, analyze the macro image to determine one or more boundaries of the at least a portion of the sample comprises: perform one or more machine learning operations using one or more image recognition models to determine one or more boundaries of the at least a portion of the sample.

In still further implementations, define a coarsely-spaced grid pattern that includes a plurality of coarsely-spaced grid cells comprises: at least one of: define a coarsely-spaced grid pattern that includes a plurality of non-adjacent grid cells; define a coarsely-spaced grid pattern that includes a plurality of adjacent grid cells; or define a coarsely-spaced grid pattern that includes a plurality of non-adjacent grid cells and a plurality of adjacent grid cells.

In at least some alternate implementations, a method of operating a microscope assembly configured for obtaining a microscopic scan of a field of view within a sample comprises: defining a scanning window over at least a portion of the sample into a plurality of grid cells, wherein individual grid cells of the plurality of grid cells are sized to include a plurality of fields of view; defining a coarsely-spaced grid pattern that includes a plurality of coarsely-spaced grid cells; performing hunt mode operations including: performing the microscopic scan at a selected field of view within a selected coarsely-spaced grid cell of a plurality of coarsely-spaced grid cells; evaluating a quality of a scan result from the microscopic scan within the selected coarsely-spaced grid cell; if the quality of the scan result at the selected field of view is not acceptable, selecting a next coarsely-spaced grid cell as the selected coarsely-spaced grid cell and returning to perform the microscopic scan and evaluate the quality of the scan result; if the quality of the scan result at the selected field of view is acceptable, then: performing the microscopic scan over all remaining fields of view of the selected coarsely-spaced grid cell; evaluating a quality of the scan results from all remaining fields of view of the selected coarsely-spaced grid cell; assessing whether the selected coarsely-spaced grid cell is acceptable based on the quality of the scan results from all fields of view of the selected coarsely-spaced grid cell; if the selected coarsely-spaced grid cell is not acceptable, selecting a next coarsely-spaced grid cell as the selected coarsely-spaced grid cell and return to perform the microscopic scan and evaluate the quality of the scan results; and if the selected coarsely-spaced grid cell is acceptable, then proceeding to scan mode operations; performing scan mode operations including: performing the microscopic scan at all fields of view within one or more adjacent grid cells within a perimeter of grid cells that are adjacent to the selected coarsely-spaced grid cell that is acceptable; evaluating a quality of the scan results from the microscopic scan at all fields of view within the one or more adjacent grid cells; and for each of the one or more adjacent grid cells, if the quality of the scan results is acceptable for the adjacent grid cell, compiling one or more aspects of the acceptable scan results with previous acceptable scan results; if one or more criteria for terminating scanning operations have not been met, selecting a next coarsely-spaced grid cell as the selected coarsely-spaced grid cell and return to perform hunt mode operations; and if the one or more criteria for terminating scanning operations have been met, providing an indication of the compiled one or more aspects of the acceptable scan results.

In still further implementations, one or more non-transitory computer-readable media bearing instructions that, when executed by one or more processing devices, controllably operate a microscope assembly to perform operations comprising: defining a scanning window over at least a portion of a sample into a plurality of grid cells, wherein individual grid cells of the plurality of grid cells are sized to include a plurality of fields of view; defining a coarsely-spaced grid pattern that includes a plurality of coarsely-spaced grid cells; performing hunt mode operations including: performing the microscopic scan at a selected field of view within a selected coarsely-spaced grid cell of a plurality of coarsely-spaced grid cells; evaluating a quality of a scan result from the microscopic scan within the selected coarsely-spaced grid cell; if the quality of the scan result at the selected field of view is not acceptable, selecting a next coarsely-spaced grid cell as the selected coarsely-spaced grid cell and return to perform the microscopic scan and evaluate the quality of the scan result; if the quality of the scan result at the selected field of view is acceptable, then: performing the microscopic scan over all remaining fields of view of the selected coarsely-spaced grid cell; evaluating a quality of the scan results from all remaining fields of view of the selected coarsely-spaced grid cell; assessing whether the selected coarsely-spaced grid cell is acceptable based on the quality of the scan results from all fields of view of the selected coarsely-spaced grid cell; if the selected coarsely-spaced grid cell is not acceptable, selecting a next coarsely-spaced grid cell as the selected coarsely-spaced grid cell and return to perform the microscopic scan and evaluate the quality of the scan results; and if the selected coarsely-spaced grid cell is acceptable, then proceeding to scan mode operations; performing scan mode operations including: performing the microscopic scan at all fields of view within one or more adjacent grid cells within a perimeter of grid cells that are adjacent to the selected coarsely-spaced grid cell that is acceptable; evaluating a quality of the scan results from the microscopic scan at all fields of view within the one or more adjacent grid cells; and for each of the one or more adjacent grid cells, if the quality of the scan results is acceptable for the adjacent grid cell, compiling one or more aspects of the acceptable scan results with previous acceptable scan results; if one or more criteria for terminating scanning operations have not been met, selecting a next coarsely-spaced grid cell as the selected coarsely-spaced grid cell and return to perform hunt mode operations; and if the one or more criteria for terminating scanning operations have been met, providing an indication of the compiled one or more aspects of the acceptable scan results.

In addition, in still other implementations, a microscopy system comprises a microscope assembly configured for obtaining a microscopic scan of a field of view within a sample, the microscope assembly being operable to: define a scanning window over at least a portion of the sample into a plurality of grid cells, each grid cell of the plurality of grid cells being sized to include a plurality of fields of view, a portion of the plurality of grid cells being coarsely-spaced grid cells; perform hunt mode operations including: perform the microscopic scan at a selected field of view within a selected coarsely-spaced grid cell of the plurality of coarsely-spaced grid cells; evaluate a quality of a scan result from the microscopic scan within the selected coarsely-spaced grid cell; if the quality of the scan result at the selected field of view is not acceptable, select a next coarsely-spaced grid cell as the selected coarsely-spaced grid cell and return to perform the microscopic scan and evaluate the quality of the scan result; if the quality of the scan result at the selected field of view is acceptable, then: perform the microscopic scan over all remaining fields of view of the selected coarsely-spaced grid cell; evaluate a quality of the scan results from all remaining fields of view of the selected coarsely-spaced grid cell; assess whether the selected coarsely-spaced grid cell is acceptable based on the quality of the scan results from all fields of view of the selected coarsely-spaced grid cell; if the selected coarsely-spaced grid cell is not acceptable, select a next coarsely-spaced grid cell as the selected coarsely-spaced grid cell and return to perform the microscopic scan and evaluate the quality of the scan result; and if the selected coarsely-spaced grid cell is acceptable, then proceed to scan mode operations; perform scan mode operations including: perform scanning and evaluating of all fields of view within one or more adjacent grid cells that are adjacent to the selected coarsely-spaced grid cell that is acceptable; and for each of the one or more adjacent grid cells, if the quality of the scan results is acceptable for the adjacent grid cell, compile one or more aspects of the acceptable scan results with previous acceptable scan results; if one or more criteria for terminating scanning operations have not been met, then return to hunt mode operations, otherwise provide an indication of the compiled one or more aspects of the acceptable scan results.

In at least some alternate implementations, the sample comprises at least one of a thick film or a thin film of a blood sample, and wherein one or more criteria for terminating scanning operations comprises: one or more of a total number of acceptable fields of view scanned, a total number of white blood cells counted, a total number of red blood cells counted, a total number of malaria parasites counted, an amount of time elapsed during hunt mode operations, an amount of time elapsed during scan mode operations, or a total amount of time elapsed. And in still other implementations, perform scanning and evaluating of all fields of view within one or more adjacent grid cells that are adjacent to the selected coarsely-spaced grid cell that is acceptable comprises: perform the microscopic scan at all fields of view within one or more adjacent grid cells within a perimeter of grid cells that are adjacent to the selected coarsely-spaced grid cell that is acceptable; and evaluate a quality of the scan results from the microscopic scan at all fields of view within the one or more adjacent grid cells.

In further implementations, perform the microscopic scan at a selected field of view within a selected coarsely-spaced grid cell of the plurality of coarsely-spaced grid cell comprises: perform the microscopic scan at a center field of view of a selected coarsely-spaced grid cell of the plurality of coarsely-spaced grid cells. And in still further implementations, assess whether the selected coarsely-spaced grid cell is acceptable based on the quality of the scan results from all fields of view of the selected coarsely-spaced grid cell comprises: assess that the selected coarsely-spaced grid cell is acceptable when at least a threshold percentage of the fields of view of the selected coarsely-spaced grid cell are evaluated to provide acceptable scan results.

Similarly, in some other implementations, the microscope assembly is further operable to perform operations comprising: if one or more criteria for terminating scanning operations have not been met, select a next coarsely-spaced grid cell as the selected coarsely-spaced grid cell and return to perform hunt mode operations. In yet other implementations, the scan mode operations further comprise: for each of the one or more adjacent grid cells, if the quality of the scan results is acceptable for the adjacent grid cell, then: perform the microscopic scan at all fields of view within one or more secondary adjacent grid cells within a perimeter of grid cells that are adjacent to the acceptable adjacent grid; evaluate a quality of the scan results from the microscopic scan at all fields of view within the one or more secondary adjacent grid cells; and for each of the one or more secondary adjacent grid cells, if the quality of the scan results is acceptable for the secondary adjacent grid cell, compile one or more aspects of the acceptable scan results with previous acceptable scan results.

In at least some additional implementations, a method of operating a microscope assembly configured for obtaining a microscopic scan of a field of view within a sample, the method comprising: defining a scanning window over at least a portion of the sample into a plurality of grid cells, each grid cell of the plurality of grid cells being sized to include a plurality of fields of view, a portion of the plurality of grid cells being coarsely-spaced grid cells; performing hunt mode operations including: performing the microscopic scan at a selected field of view within a selected coarsely-spaced grid cell of the plurality of coarsely-spaced grid cells; evaluating a quality of a scan result from the microscopic scan within the selected coarsely-spaced grid cell; if the quality of the scan result at the selected field of view is not acceptable, selecting a next coarsely-spaced grid cell as the selected coarsely-spaced grid cell and return to performing the microscopic scan and evaluating the quality of the scan result; if the quality of the scan result at the selected field of view is acceptable, then: performing the microscopic scan over all remaining fields of view of the selected coarsely-spaced grid cell; evaluating a quality of the scan results from all remaining fields of view of the selected coarsely-spaced grid cell; assessing whether the selected coarsely-spaced grid cell is acceptable based on the quality of the scan results from all fields of view of the selected coarsely-spaced grid cell; if the selected coarsely-spaced grid cell is not acceptable, selecting a next coarsely-spaced grid cell as the selected coarsely-spaced grid cell and returning to performing the microscopic scan and evaluating the quality of the scan result; and if the selected coarsely-spaced grid cell is acceptable, then proceeding to scan mode operations; performing scan mode operations including: performing scanning and evaluating of all fields of view within one or more adjacent grid cells that are adjacent to the selected coarsely-spaced grid cell that is acceptable; and for each of the one or more adjacent grid cells, if the quality of the scan results is acceptable for the adjacent grid cell, compiling one or more aspects of the acceptable scan results with previous acceptable scan results; if one or more criteria for terminating scanning operations have not been met, then returning to hunt mode operations, otherwise providing an indication of the compiled one or more aspects of the acceptable scan results.

In still other implementations, one or more non-transitory computer-readable media bearing instructions that, when executed by one or more processing devices, controllably operate a microscope assembly to perform operations comprising: defining a scanning window over at least a portion of the sample into a plurality of grid cells, each grid cell of the plurality of grid cells being sized to include a plurality of fields of view, a portion of the plurality of grid cells being coarsely-spaced grid cells; performing hunt mode operations including: performing the microscopic scan at a selected field of view within a selected coarsely-spaced grid cell of the plurality of coarsely-spaced grid cell; evaluating a quality of a scan result from the microscopic scan within the selected coarsely-spaced grid cell; if the quality of the scan result at the selected field of view is not acceptable, selecting a next coarsely-spaced grid cell as the selected coarsely-spaced grid cell and return to performing the microscopic scan and evaluating the quality of the scan result; if the quality of the scan result at the selected field of view is acceptable, then: performing the microscopic scan over all remaining fields of view of the selected coarsely-spaced grid cell; evaluating a quality of the scan results from all remaining fields of view of the selected coarsely-spaced grid cell; assessing whether the selected coarsely-spaced grid cell is acceptable based on the quality of the scan results from all fields of view of the selected coarsely-spaced grid cell; if the selected coarsely-spaced grid cell is not acceptable, selecting a next coarsely-spaced grid cell as the selected coarsely-spaced grid and returning to performing the microscopic scan and evaluating the quality of the scan result; and if the selected coarsely-spaced grid cell is acceptable, then proceeding to scan mode operations; performing scan mode operations including: performing scanning and evaluating of all fields of view within one or more adjacent grid cells that are adjacent to the selected coarsely-spaced grid cell that is acceptable; and for each of the one or more adjacent grid cells, if the quality of the scan results is acceptable for the adjacent grid cell, compiling one or more aspects of the acceptable scan results with previous acceptable scan results; if one or more criteria for terminating scanning operations have not been met, then returning to hunt mode operations, otherwise providing an indication of the compiled one or more aspects of the acceptable scan results.

It should be appreciated that the particular embodiments of processes described herein are merely possible implementations of the present disclosure, and that the present disclosure is not limited to the particular implementations described herein and shown in the accompanying figures. In addition, in alternate implementations, certain acts need not be performed in the order described, and may be modified or combined, and/or may be omitted entirely, depending on the circumstances. Moreover, in various implementations, the acts described may be implemented by a computer, controller, processor, programmable device, or any other suitable device, and may be based on instructions stored on one or more computer-readable media or otherwise stored or programmed into such devices. In the event that computer-readable media are used, the computer-readable media can be any available media that can be accessed by a device to implement the instructions stored thereon.

Various methods, systems, and techniques have been described herein in the general context of computer-executable instructions, such as program modules, executed by one or more processors or other devices. Generally, program modules include routines, programs, objects, components, data structures, etc. that perform particular tasks or implement particular abstract data types. Typically, the functionality of the program modules may be combined or distributed as desired in various alternate embodiments. In addition, embodiments of these methods, systems, and techniques may be stored on or transmitted across some form of computer readable media.

The foregoing examples are meant to be illustrative only, and omission of an example here should not be construed as intentional or intentionally disavowing subject matter. The scope of the invention set forth herein is defined solely by the following claims at the end of this application.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scalable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a nonexclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, and these examples and/or lists may be delineated with parentheses, commas, the abbreviation "e.g.," or some combination thereof. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although one or more users maybe shown and/or described herein, and other places, as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in at least some embodiments," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Throughout this application, the terms "in an implementation," "in at least some implementations," "in one implementation," "in some implementations," "in several implementations," "in at least one implementation," "in various implementations," and the like, may be used. Each of these terms, and all such similar terms should be construed as "in at least one implementation, and possibly but not necessarily all implementations," unless explicitly stated otherwise. Specifically, unless explicitly stated otherwise, the intent of phrases like these is to provide non-exclusive and non-limiting examples of implementations of the invention. The mere statement that one, some, or may implementations include one or more things or have one or more features, does not imply that all implementations include one or more things or have one or more features, but also does not imply that such implementations must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A microscopy system, comprising:
a microscope assembly configured for obtaining a microscopic scan of a field of view within a sample, the microscope assembly being operable to perform operations including:
define a scanning window over at least a portion of the sample into a plurality of grid cells, wherein individual grid cells of the plurality of grid cells are sized to
include a plurality of fields of view;
define a coarsely-spaced grid pattern that includes a
plurality of coarsely-spaced grid cells;
perform hunt mode operations including:
  perform the microscopic scan at a selected field of view
    within a selected coarsely-spaced grid cell of the
    plurality of coarsely-spaced grid cell;
  evaluate a quality of a scan result from the microscopic
    scan within the selected coarsely-spaced grid cell;
  if the quality of the scan result at the selected field of
    view is not acceptable, select a next coarsely-spaced
    grid cell as the selected coarsely-spaced grid cell and
    return to perform the microscopic scan and evaluate
    the quality of the scan result;
  if the quality of the scan result at the selected field of
    view is acceptable, then:
    perform the microscopic scan over all remaining
      fields of view of the selected coarsely-spaced grid
      cell;
    evaluate a quality of the scan results from all remaining fields of view of the selected coarsely-spaced
      grid cell;
    assess whether the selected coarsely-spaced grid cell
      is acceptable based on the quality of the scan
      results from all fields of view of the selected
      coarsely-spaced grid cell;
    if the selected coarsely-spaced grid cell is not acceptable, select a next coarsely-spaced grid cell as the
      selected coarsely-spaced grid cell and return to perform the microscopic scan and evaluate the quality
      of the scan results; and
    if the selected coarsely-spaced grid cell is acceptable,
      then proceed to scan mode operations;
  perform scan mode operations including:
    perform the microscopic scan at all fields of view
      within one or more adjacent grid cells within a
      perimeter of grid cells that are adjacent to the
      selected coarsely-spaced grid cell that is acceptable;
    evaluate a quality of the scan results from the microscopic scan at all fields of view within the one or
      more adjacent grid cells; and
    for each of the one or more adjacent grid cells, if the
      quality of the scan results is acceptable for the
      adjacent grid cell, compile one or more aspects of the
      acceptable scan results with previous acceptable
      scan results;
  if one or more criteria for terminating scanning operations
    have not been met, select a next coarsely-spaced grid
    cell as the selected coarsely-spaced grid cell and return
    to perform hunt mode operations; and
  if the one or more criteria for terminating scanning
    operations have been met, provide an indication of the
    compiled one or more aspects of the acceptable scan
    results.

2. The system of claim 1, wherein the sample comprises at least one of a thick film or a thin film of a blood sample, and wherein one or more criteria for terminating scanning operations comprises:
  one or more of a total number of acceptable fields of view scanned, a total number of white blood cells counted, a total number of red blood cells counted, a total number of malaria parasites counted, an amount of time elapsed during hunt mode operations, an amount of time elapsed during scan mode operations, or a total amount of time elapsed.

3. The system of claim 1, wherein define a scanning window over at least a portion of the sample into a plurality of grid cells, wherein individual grid cells of the plurality of grid cells are sized to include a plurality of fields of view comprises:
  define a scanning window into a plurality of square grid cells, wherein individual square grid cells include an equal number of rows and columns of fields of view.

4. The system of claim 1, wherein perform the microscopic scan at a selected field of view within a selected coarsely-spaced grid cell of the plurality of coarsely-spaced grid cells comprises:
  perform the microscopic scan at a center field of view of a selected coarsely- spaced grid cell of the plurality of coarsely-spaced grid cells.

5. The system of claim 1, wherein assess whether the selected coarsely-spaced grid cell is acceptable based on the quality of the scan results from all fields of view of the selected coarsely-spaced grid cell comprises:
  assess that the selected coarsely-spaced grid cell is acceptable when at least a threshold percentage of the fields of view of the selected coarsely-spaced grid cell are evaluated to provide acceptable scan results.

6. The system of claim 1, wherein define a coarsely-spaced grid pattern that includes a plurality of coarsely-spaced grid cells comprises:
  define a coarsely-spaced grid pattern that includes a first coarsely-spaced grid cell located proximate to a center of the scanning window, and a plurality of first non-adjacent grid cells located within a first non-adjacent perimeter disposed about and spaced apart from the first coarsely-spaced grid cell.

7. The system of claim 6, wherein select a next coarsely-spaced grid cell as the selected coarsely-spaced grid cell comprises:
  select a next coarsely-spaced grid cell as the selected coarsely-spaced grid cell, including at least one of:
    proceed outwardly from the first coarsely-spaced grid cell to select a first non-adjacent grid cell located within the first non-adjacent perimeter; or
    proceed laterally from one of first non-adjacent grid cells to select another of the first non-adjacent grid cells located within the first non-adjacent perimeter.

8. The system of claim 6, wherein define a coarsely-spaced grid pattern that includes a plurality of coarsely-spaced grid cells comprises:
  define a coarsely-spaced grid pattern that includes a plurality of second non-adjacent grid cells located within a second non-adjacent perimeter disposed about and spaced apart from the first non-adjacent perimeter.

9. The system of claim 1, wherein perform the microscopic scan at all fields of view within one or more adjacent grid cells within a perimeter of grid cells that are adjacent to the selected coarsely-spaced grid cell that is acceptable comprises:
  perform the microscopic scan at all fields of view within half of the adjacent grid cells within a perimeter of grid cells that are adjacent to the selected coarsely-spaced grid cell that is acceptable.

10. The system of claim 1, wherein perform the microscopic scan at all fields of view within one or more adjacent grid cells within a perimeter of grid cells that are adjacent to the selected coarsely-spaced grid cell that is acceptable comprises:
  perform the microscopic scan at all fields of view within one or more adjacent grid cells within a perimeter of grid cells that are adjacent to, and that share a common boundary with, the selected coarsely-spaced grid cell that is acceptable.

11. The system of claim 1, wherein perform the microscopic scan at all fields of view within one or more adjacent grid cells within a perimeter of grid cells that are adjacent to the selected coarsely-spaced grid cell that is acceptable comprises:

perform the microscopic scan at all fields of view within one or more adjacent grid cells within a perimeter of grid cells that are adjacent to, and that share a common cornerpoint with, the selected coarsely-spaced grid cell that is acceptable.

12. The system of claim 1, wherein perform scan mode operations further comprises:

for each of the one or more adjacent grid cells, if the quality of the scan results is acceptable for the adjacent grid cell, then:
perform the microscopic scan at all fields of view within one or more secondary adjacent grid cells within a perimeter of grid cells that are adjacent to the acceptable adjacent grid cell;
evaluate a quality of the scan results from the microscopic scan at all fields of view within the one or more secondary adjacent grid cells; and
for each of the one or more secondary adjacent grid cells, if the quality of the scan results is acceptable for the secondary adjacent grid cell, compile one or more aspects of the acceptable scan results with previous acceptable scan results.

13. The system of claim 1, wherein define a coarsely-spaced grid pattern that includes a plurality of coarsely-spaced grid cells comprises:

at least one of:
define a coarsely-spaced grid pattern that includes a plurality of non-adjacent grid cells;
define a coarsely-spaced grid pattern that includes a plurality of adjacent grid cells; or
define a coarsely-spaced grid pattern that includes a plurality of non-adjacent grid cells and a plurality of adjacent grid cells.

14. A microscopy system, comprising:

a microscope assembly configured for obtaining a microscopic scan of a field of view within a sample, the microscope assembly being operable to:
define a scanning window over at least a portion of the sample into a plurality of grid cells, each grid cell of the plurality of grid cells being sized to include a plurality of fields of view, a portion of the plurality of grid cells being coarsely-spaced grid cells;
perform hunt mode operations including:
perform the microscopic scan at a selected field of view within a selected coarsely-spaced grid cell of the plurality of coarsely-spaced grid cells;
evaluate a quality of a scan result from the microscopic scan within the selected coarsely-spaced grid cell;
if the quality of the scan result at the selected field of view is not acceptable, select a next coarsely-spaced grid cell as the selected coarsely-spaced grid cell and return to perform the microscopic scan and evaluate the quality of the scan result;
if the quality of the scan result at the selected field of view is acceptable, then:
perform the microscopic scan over all remaining fields of view of the selected coarsely-spaced grid cell;
evaluate a quality of the scan results from all remaining fields of view of the selected coarsely-spaced grid cell;
assess whether the selected coarsely-spaced grid cell is acceptable based on the quality of the scan results from all fields of view of the selected coarsely-spaced grid cell;
if the selected coarsely-spaced grid cell is not acceptable, select a next coarsely-spaced grid cell as the selected coarsely-spaced grid cell and return to perform the microscopic scan and evaluate the quality of the scan result; and
if the selected coarsely-spaced grid cell is acceptable, then proceed to scan mode operations;
perform scan mode operations including:
perform scanning and evaluating of all fields of view within one or more adjacent grid cells that are adjacent to the selected coarsely-spaced grid cell that is acceptable; and
for each of the one or more adjacent grid cells, if the quality of the scan results is acceptable for the adjacent grid cell, compile one or more aspects of the acceptable scan results with previous acceptable scan results; and
if one or more criteria for terminating scanning operations have not been met, then return to hunt mode operations, otherwise provide an indication of the compiled one or more aspects of the acceptable scan results.

15. The system of claim 14, wherein the sample comprises at least one of a thick film or a thin film of a blood sample, and wherein one or more criteria for terminating scanning operations comprises:

one or more of a total number of acceptable fields of view scanned, a total number of white blood cells counted, a total number of red blood cells counted, a total number of malaria parasites counted, an amount of time elapsed during hunt mode operations, an amount of time elapsed during scan mode operations, or a total amount of time elapsed.

16. The system of claim 14, wherein perform scanning and evaluating of all fields of view within one or more adjacent grid cells that are adjacent to the selected coarsely-spaced grid cell that is acceptable comprises:

perform the microscopic scan at all fields of view within one or more adjacent grid cells within a perimeter of grid cells that are adjacent to the selected coarsely-spaced grid cell that is acceptable; and
evaluate a quality of the scan results from the microscopic scan at all fields of view within the one or more adjacent grid cells.

17. The system of claim 14, wherein perform the microscopic scan at a selected field of view within a selected coarsely-spaced grid cell of the plurality of coarsely-spaced grid cell comprises:

perform the microscopic scan at a center field of view of a selected coarsely-spaced grid cell of the plurality of coarsely-spaced grid cells.

18. The system of claim 14, wherein assess whether the selected coarsely-spaced grid cell is acceptable based on the quality of the scan results from all fields of view of the selected coarsely-spaced grid cell comprises:

assess that the selected coarsely-spaced grid cell is acceptable when at least a threshold percentage of the fields of view of the selected coarsely-spaced grid cell are evaluated to provide acceptable scan results.

19. The system of claim 14, wherein the microscope assembly is further operable to perform operations comprising:
 if one or more criteria for terminating scanning operations have not been met, select a next coarsely-spaced grid cell as the selected coarsely-spaced grid cell and return to perform hunt mode operations.

20. The system of claim 14, wherein the scan mode operations further comprise:
 for each of the one or more adjacent grid cells, if the quality of the scan results is acceptable for the adjacent grid cell, then:
 perform the microscopic scan at all fields of view within one or more secondary adjacent grid cells within a perimeter of grid cells that are adjacent to the acceptable adjacent grid cell;
 evaluate a quality of the scan results from the microscopic scan at all fields of view within the one or more secondary adjacent grid cells; and
 for each of the one or more secondary adjacent grid cells, if the quality of the scan results is acceptable for the secondary adjacent grid cell, compile one or more aspects of the acceptable scan results with previous acceptable scan results.

21. A method of operating a microscope assembly configured for obtaining a microscopic scan of a field of view within a sample, the method comprising:
 defining a scanning window over at least a portion of the sample into a plurality of grid cells, each grid cell of the plurality of grid cells being sized to include a plurality of fields of view, a portion of the plurality of grid cells being coarsely-spaced grid cells;
 performing hunt mode operations including:
 performing the microscopic scan at a selected field of view within a selected coarsely-spaced grid cell of the plurality of coarsely-spaced grid cell;
 evaluating a quality of a scan result from the microscopic scan within the selected coarsely-spaced grid cell;
 if the quality of the scan result at the selected field of view is not acceptable, selecting a next coarsely-spaced grid cell as the selected coarsely-spaced grid cell and return to performing the microscopic scan and evaluating the quality of the scan result;
 if the quality of the scan result at the selected field of view is acceptable, then:
 performing the microscopic scan over all remaining fields of view of the selected coarsely-spaced grid cell;
 evaluating a quality of the scan results from all remaining fields of view of the selected coarsely-spaced grid cell;
 assessing whether the selected coarsely-spaced grid cell is acceptable based on the quality of the scan results from all fields of view of the selected coarsely-spaced grid cell;
 if the selected coarsely-spaced grid cell is not acceptable, selecting a next coarsely-spaced grid cell as the selected coarsely-spaced grid cell and returning to performing the microscopic scan and evaluating the quality of the scan result; and
 if the selected coarsely-spaced grid cell is acceptable, then proceeding to scan mode operations;
 performing scan mode operations including:
 performing scanning and evaluating of all fields of view within one or more adjacent grid cells that are adjacent to the selected coarsely-spaced grid cell that is acceptable; and
 for each of the one or more adjacent grid cells, if the quality of the scan results is acceptable for the adjacent grid cell, compiling one or more aspects of the acceptable scan results with previous acceptable scan results; and
 if one or more criteria for terminating scanning operations have not been met, then returning to hunt mode operations, otherwise providing an indication of the compiled one or more aspects of the acceptable scan results.

22. The method of claim 21, wherein the sample comprises at least one of a thick film or a thin film of a blood sample, and wherein one or more criteria for terminating scanning operations comprises:
 one or more of a total number of acceptable fields of view scanned, a total number of white blood cells counted, a total number of red blood cells counted, a total number of malaria parasites counted, an amount of time elapsed during hunt mode operations, an amount of time elapsed during scan mode operations, or a total amount of time elapsed.

23. The method of claim 21, wherein performing scanning and evaluating of all fields of view within one or more adjacent grid cells that are adjacent to the selected coarsely-spaced grid cell that is acceptable comprises:
 performing the microscopic scan at all fields of view within one or more adjacent grid cells within a perimeter of grid cells that are adjacent to the selected coarsely-spaced grid cell that is acceptable; and
 evaluating a quality of the scan results from the microscopic scan at all fields of view within the one or more adjacent grid cells.

24. The method of claim 21, wherein performing the microscopic scan at a selected field of view within a selected coarsely-spaced grid cell of the plurality of coarsely-spaced grid cells comprises:
 performing the microscopic scan at a center field of view of a selected coarsely-spaced grid cell of the plurality of coarsely-spaced grid cells.

25. The method of claim 21, wherein assessing whether the selected coarsely-spaced grid cell is acceptable based on the quality of the scan results from all fields of view of the selected coarsely-spaced grid cell comprises:
 assessing that the selected coarsely-spaced grid cell is acceptable when at least a threshold percentage of the fields of view of the selected coarsely-spaced grid cell are evaluated to provide acceptable scan results.

26. The method of claim 21, wherein the microscope assembly is further operable to perform operations comprising:
 if one or more criteria for terminating scanning operations have not been met, selecting a next coarsely-spaced grid cell as the selected coarsely-spaced grid cell and returning to performing hunt mode operations.

27. The method of claim 21, wherein the scan mode operations further comprise:
 for each of the one or more adjacent grid cells, if the quality of the scan results is acceptable for the adjacent grid cell, then:
 performing the microscopic scan at all fields of view within one or more secondary adjacent grid cells within a perimeter of grid cells that are adjacent to the acceptable adjacent grid cell;

evaluating a quality of the scan results from the microscopic scan at all fields of view within the one or more secondary adjacent grid cells; and for each of the one or more secondary adjacent grid cells, if the quality of the scan results is acceptable for the secondary adjacent grid cell, compiling one or more aspects of the acceptable scan results with previous acceptable scan results.

* * * * *